(12) United States Patent
Sewell et al.

(10) Patent No.: US 12,535,195 B2
(45) Date of Patent: Jan. 27, 2026

(54) INFLATABLE, MOVEABLE STRUCTURE

(71) Applicant: AIR GIANTS LTD, Bristol (GB)

(72) Inventors: Richard Sewell, Pontypool (GB); Emma Powell, Bristol (GB); Robert Nixdorf, Bristol (GB)

(73) Assignee: AIR GIANTS LTD, Bristol (GB)

(*) Notice: Subject to any disclaimer, the term of this patent is extended or adjusted under 35 U.S.C. 154(b) by 321 days.

(21) Appl. No.: 18/030,128

(22) PCT Filed: Oct. 14, 2021

(86) PCT No.: PCT/EP2021/078550
§ 371 (c)(1),
(2) Date: Apr. 4, 2023

(87) PCT Pub. No.: WO2022/079216
PCT Pub. Date: Apr. 21, 2022

(65) Prior Publication Data
US 2023/0366524 A1 Nov. 16, 2023

(30) Foreign Application Priority Data

Oct. 15, 2020 (GB) .................................. 2016387

(51) Int. Cl.
*G09F 19/00* (2006.01)
*F21V 3/02* (2006.01)
(Continued)

(52) U.S. Cl.
CPC .......... *F21V 3/026* (2013.01); *F21V 23/0492* (2013.01); *G05D 7/0641* (2013.01); *G09F 19/008* (2021.05)

(58) Field of Classification Search
CPC ........ F15B 15/103; F15B 11/06; F15B 11/17; F15B 15/10; F21V 3/026; F21V 23/0492; G09F 19/008
See application file for complete search history.

(56) References Cited

U.S. PATENT DOCUMENTS 5,474,485 A 12/1995 Smrt
2005/0063189 A1 3/2005 Ossolinski
(Continued)

FOREIGN PATENT DOCUMENTS

CN 110033717 A 7/2019
FR 2736706 B1 9/1997
(Continued)

*Primary Examiner* — Nathaniel E Wiehe
*Assistant Examiner* — Daniel S Collins
(74) *Attorney, Agent, or Firm* — Smartpat PLC

(57) ABSTRACT

The present invention relates to an inflatable, moveable structure comprising: a fluid source; at least one chamber comprising a substantially inelastic outer membrane defining a cavity extending therebetween, in which the or each cavity is in fluid communication with the fluid source, and in which the or each chamber further comprises at least one first valve located on and extending through the outer membrane thereof; and a control system. The control system comprises at least one of: a plurality of pressure sensors, each pressure sensor located within a corresponding chamber and operable to determine the pressure of the fluid within the corresponding chamber and/or the pressure ratio of fluid within at least two chambers; and/or at least one spatial orientation sensor configured to determine the spatial orientation of the at least one chambers; in which the control system is operable to independently control operation of the at least one first and/or second valve in communication with the at least one chamber in response to one or more of the determined spatial orientation of the structure as determined by the spatial orientation sensor(s) and/or fluid pressure within the corresponding chamber(s) and/or pressure ratio of fluid within at least two chambers as determined by the pressure sensor(s).

37 Claims, 16 Drawing Sheets

(51) Int. Cl.
   *F21V 23/04* (2006.01)
   *G05D 7/06* (2006.01)

(56) References Cited

U.S. PATENT DOCUMENTS

| | | |
|---|---|---|
| 2006/0107573 A1 | 5/2006 | Machala |
| 2008/0106888 A1 | 5/2008 | Nalitchaev et al. |
| 2008/0233831 A1 | 9/2008 | Hsu |
| 2017/0321709 A1 | 11/2017 | Shao |

FOREIGN PATENT DOCUMENTS

| | | |
|---|---|---|
| GB | 2292825 A | 3/1996 |
| WO | 9112863 A1 | 9/1991 |

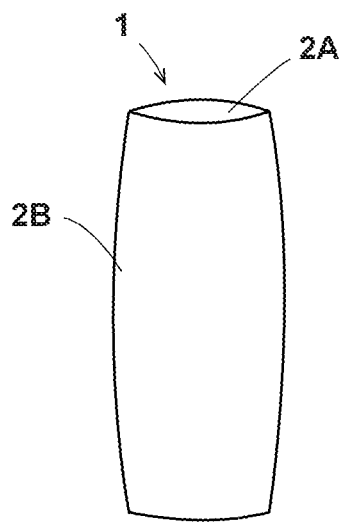 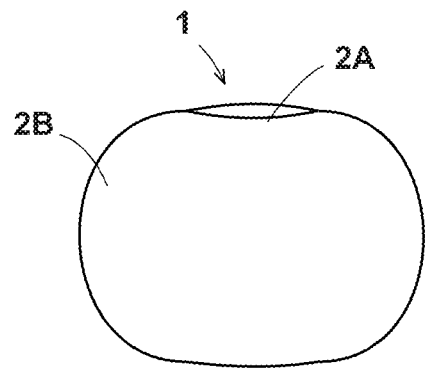
FIGURE 1A          FIGURE 1B
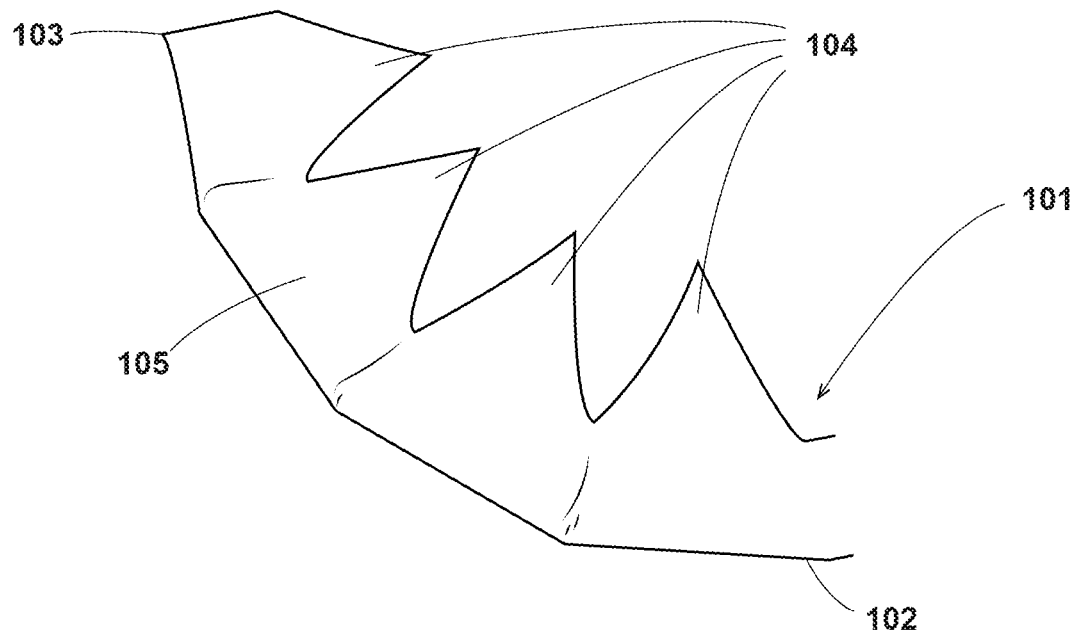
FIGURE 2A

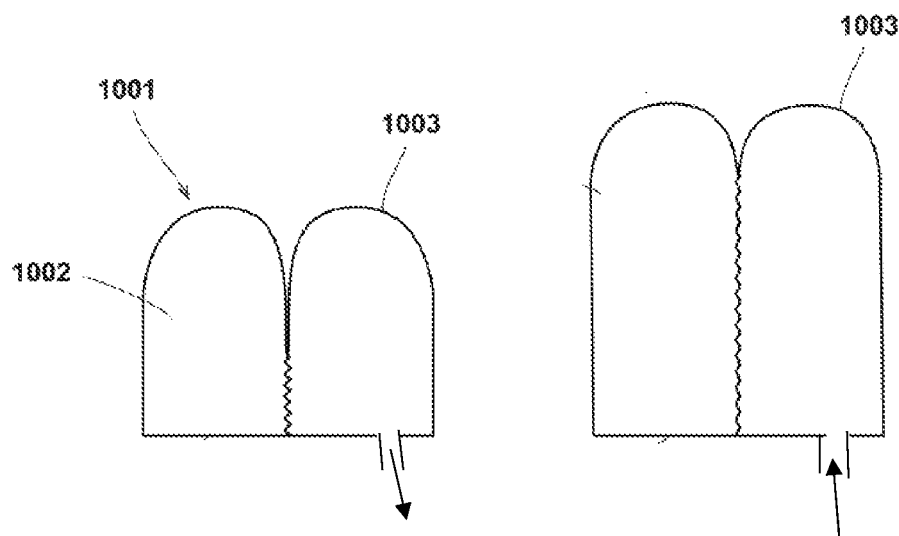
FIGURE 10A
FIGURE 10B
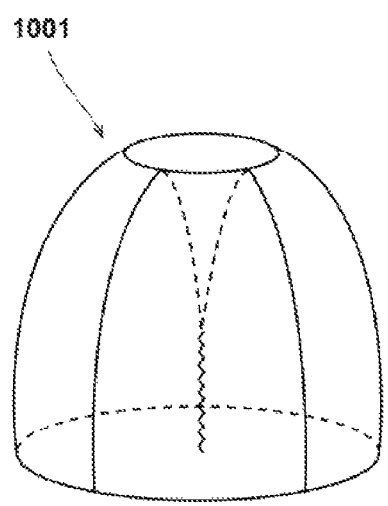
FIGURE 10C

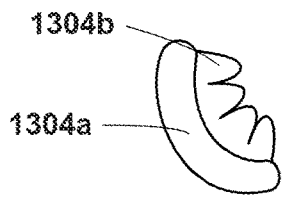
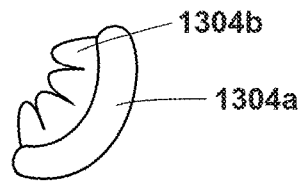
FIGURE 13D
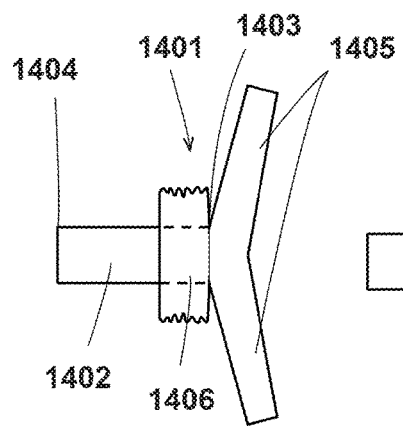
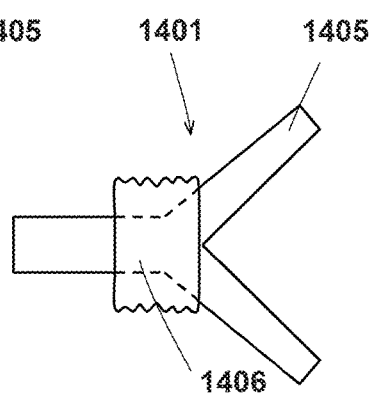
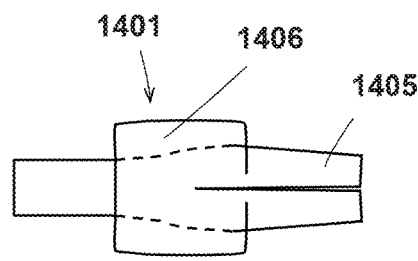
FIGURE 14A  FIGURE 14B  FIGURE 14C
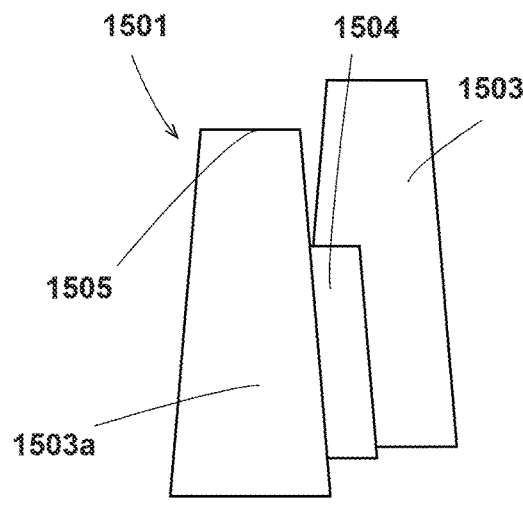
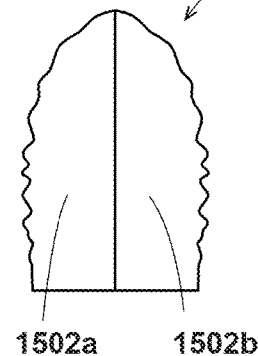
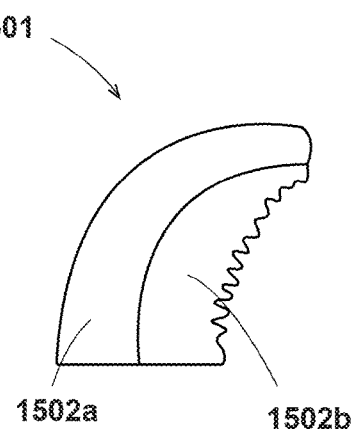
FIGURE 15A  FIGURE 15B  FIGURE 15C

INFLATABLE, MOVEABLE STRUCTURE

CROSS-REFERENCE TO RELATED APPLICATIONS

This application is a national stage application, filed under 35 U.S.C. § 371, of International Patent Application No. PCT/EP2021/078550, filed on 14-Oct-2021, which claims the benefit of United Kindom Patent Application No. GB 2016387.9, filed 15 Oct. 2020.

BACKGROUND

The present invention relates to an inflatable, moveable structure which is capable of effecting movement whilst presenting a constantly taut outer surface of the structure.

SUMMARY OF INVENTION

According to a first aspect of the present invention, there is provided an inflatable, moveable structure comprising:
- a fluid source;
- at least one chamber comprising a substantially inelastic outer membrane defining a cavity extending therebetween, in which the or each cavity is in fluid communication with the fluid source;
- a regulatory mechanism in communication with the or each chamber, in which the regulatory mechanism is configured to control fluid flow into or out of the corresponding cavity; and
- a control system comprising at least one sensor, in which the at least one sensor comprises:
  - at least one pressure sensor, the or each pressure sensor located within a corresponding chamber and operable to determine the pressure of the fluid within the corresponding chamber and/or the pressure ratio of fluid within at least two chambers; and/or
  - at least one spatial orientation sensor configured to determine the spatial orientation of the at least one chambers;
  - in which the control system is operable to effect movement of the structure by controlling operation of the regulatory mechanism in response to one or more of the determined spatial orientation of the structure as determined by the spatial orientation sensor(s) and/or fluid pressure within the corresponding chamber(s) and/or pressure ratio of fluid within at least two chambers as determined by the pressure sensor(s).

The structure preferably comprises a constantly taut outer surface before and/or during and/or after movement. The outer surface of the inelastic outer membrane of the or each chamber preferably remains taut before and/or during and/or after movement. Preferably, the structure comprises a constantly taut outer surface before, during and after movement. Preferably, the outer surface of the inelastic outer membrane of the or each chamber preferably remains taut before, during and after movement.

The control system is preferably operable to effect movement of one or more parts of the structure by controlling operation of the regulatory mechanism. In one embodiment, the control system is operable to effect movement of the structure such that there is a smooth transition in movement between adjoining and/or adjacent parts of the structure.

The control system is preferably operable to effect repetitive, smooth movement of one or more parts of the structure by controlling operation of the regulatory mechanism.

The regulatory mechanism may comprise one or more valves and/or openings. For example, the regulatory mechanism may comprise an inlet valve configured to control passage of fluid into a corresponding cavity. The regulatory mechanism may comprise an outlet valve configured to control passage of fluid out of a corresponding cavity. The regulatory mechanism may for example comprise an inlet opening configured to control passage of fluid into a corresponding cavity. The regulatory mechanism may comprise an outlet opening configured to control passage of fluid out of a corresponding cavity. The one or more valves and/or openings may be located on and extend through the inelastic outer membrane. The one or more valves and/or may be provided on a conduit in fluid communication with a corresponding chamber(s).

The regulatory mechanism is preferably configured to independently control one or more valves and/or openings to effect predetermined movement of the structure. For example, the regulatory mechanism is preferably configured to independently control operation of one or more inlet valve(s) and/or outlet valve(s), and/or opening(s) to effect predetermined movement of the structure. In one embodiment, the regulatory mechanism may be configured to independently alter the dimensions and/or shape of one or more openings to effect predetermined movement of the structure.

The structure may comprise at least one second valve located between the fluid source and the at least one set of chamber.

The structure preferably comprises a plurality of chambers, for example at least two, for example at least three chambers.

The chambers may also be referred to as inflatable chambers. The term "inflatable chamber" is used herein to refer to a chamber which is configured to fluid from a fluid source to expand the chamber.

In one embodiment, the structure comprises at least one set of antagonistic chambers. The term "antagonistic chambers" is used herein to refer to a set of chambers which are operating in opposition to each other, for example as one chamber expands (for example receives fluid from a fluid source into the chamber) the other chamber of the antagonistic chambers contracts (for example releases fluid from the chamber). The or each set of antagonistic chambers comprises at least a pair, for example at least three, antagonistic chambers.

Each set comprises a plurality of chambers. Each chamber comprises a substantially inelastic outer membrane defining a cavity extending therebetween, and in which each cavity is in fluid communication with the fluid source. Each chamber within the or each set of antagonistic chambers further comprises a regulatory mechanism (for example at least one first valve or opening located on and extending through the outer membrane thereof). The control system is preferably operable such that a first chamber within the or each set of antagonistic chambers acts in opposition to the other chamber(s) within the corresponding set of antagonistic chambers. For example, the control system may be operable to control the regulatory mechanism (for example first valve or opening) of each chamber within the set of antagonistic chambers such that the regulatory mechanism (e.g. first valve or opening) of a first chamber acts in opposition to the regulatory mechanism (e.g. first valve or opening) of a second chamber within the or each set of antagonistic chambers. The first and second chambers are preferably located adjacent each other. For example, the control system may be operable to place a regulatory mechanism (e.g. first valve or opening) of a first chamber of a set of antagonistic chambers in an open position and to, for example simultaneously, place a regulatory mechanism (e.g. first valve or opening) of a second chamber within the set of antagonistic chambers in a closed position, and vice versa.

The control system is preferably operable to control the regulatory mechanism (for example first valves or opening) of chambers within each set of antagonistic chambers independently from the regulatory mechanism (for example first valves or openings) of chambers within other sets of antagonistic chambers to effect predetermined movement of the structure.

The control system may comprise a timer to enable movement to be effected at predetermined times and/or over predetermined time periods as required.

In one embodiment, the cavity of each chamber of the at least one set of antagonistic chambers is substantially sealed from, and not in communication with, the cavity of the other chamber of the same set of antagonistic chambers. A first cavity of a first chamber of the at least one set of antagonistic chambers is preferably substantially sealed from, and not in communication with, a second cavity of a second chamber of the at least one set of antagonistic chambers.

In one embodiment, the cavity of each chamber is independently in fluid communication with the fluid source. In one embodiment, the regulatory mechanism further comprises a plurality of second valves, each second valve being located between the fluid source and the corresponding chamber.

In one embodiment, the at least one spatial orientation sensor(s) is an IMU.

In one embodiment, the control system, for example the pressure sensor(s), is operable to determine the pressure of the fluid within the or each chamber of the structure. In one embodiment, the control system, for example the pressure sensor(s), is operable to determine the pressure ratio of the fluid within a or each chamber, for example within a or each chamber of the or each set of antagonistic chambers. The control system may be operable to independently control the at least one first and/or second valve to control the flow of fluid into and/or out of one or more chambers of a structure, for example of one or more chambers of one or more antagonistic set of chambers, in response to the determined pressure and/or pressure ratio of the fluid within the chambers.

The control system is preferably operable to independently move a first and/or second valve to an open position or to a closed position, or to any position therebetween, in response to the determined pressure and/or pressure ratio of the fluid within the corresponding chamber(s). The control system is preferably operable to independently adjust the extent to which a first and/or second valve is opened in response to the determined pressure and/or pressure ratio of the fluid within the corresponding chamber(s).

In one embodiment, the overall stiffness of the inflatable, moveable structure can be controlled, by the control system, by varying the pressure in the at least one chamber, for example in one or more, for example in each chamber, of a structure for example by varying the sum of the pressures in chambers, for example in the one or more sets of antagonistic chambers.

The fluid source may comprise air or any other suitable fluid, such as for example other gases or gas mixtures, or liquids such as for example water or oil, or mixtures thereof. The fluid source may for example be a high volume, low pressure air source used in combination with blowers to generate pressurised air.

The inelastic outer membrane may be joined together, to provide a chamber and/or to connect adjacent chambers together, using any suitable technique such as for example: sewing, heat sealing or RF welding.

The at least one structure may further comprise a fluid-box, preferably an airbox, in communication with the fluid source, located adjacent, and in fluid communication with, a corresponding cavity of a chamber. The second valve is preferably located between the fluid-box (for example the airbox) and the chamber. The fluid-box (e.g. airbox) is preferably configured in use to be permanently filled or inflated with fluid from the fluid source.

The at least one structure may further comprise a valve box spaced apart from the chamber(s), in which each valve box is connected to a corresponding chamber.

The first and/or second valves are preferably rotary grid-iron valves. The first and/or second valves may be operable (to move between open and closed positions) by a servo motor.

The structure may further comprise one or more rigid element chambers configured in use to be permanently inflated. The one or more rigid element chambers may be inflatable. The one or more rigid element chambers preferably comprise a substantially inelastic outer membrane defining a chamber located therein. The one or more rigid element chambers may be located at any suitable location within the structure to provide a rigid element in the desired location.

The structure may further comprise one or more rigid elements, such as for example non-inflatable, stiff materials, such as for example tubes, for example plastic or metal tubes.

The structure may further comprise one or more elastic elements. Location of the one or more elastic elements is preferably selected to enable movement of the at least one chamber, for example of the at least one set of antagonistic chambers. In one embodiment, the at least one chamber, for example the at least one set of antagonistic chambers, is preferably located adjacent at least one elastic element.

The presence of the one or more rigid elements, rigid element chambers and/or elastic elements may provide, in certain circumstances, the necessary support for the structure to maintain its desired shape whilst enabling the at least one chamber, for example the at least one antagonistic set(s) of chambers, to be moved, by supply or removal of fluid, as required.

The structure may further comprise one or more translucent portions, for example translucent fabric. The inelastic outer membrane, or a portion thereof, of one or more chambers may comprises one or more translucent portions comprising for example translucent fabric. The structure may further comprise one or more lighting devices, located at or adjacent one or more translucent portions, for example at or adjacent translucent portions of the or each translucent portion of an inelastic outer membrane, configured to illuminate the structure at or adjacent one or more translucent portions. The control system is preferably configured to enable independent control and operation of the one or more lighting devices.

The structure may further comprise a computer in communication with the control system, for example via a bus (e.g. CANbus). The computer is operable to enable local and independent control of the pressure within each chamber and/or the spatial orientation of the set of antagonistic chambers and/or lighting within the structure.

It is to be understood that the use of antagonistic chambers enables motion generation for the structure. This is achieved by the control system being operable to:

Manage the ratios of pressures in the set(s) of antagonistic chambers; and/or

Selectively supply and/or remove fluid (for example air) from one or more of the chambers, for example one or more antagonistic chambers to drive the structure towards a target position; and/or Manage pressure within a chamber which is working against gravity; and/or Manage fluid volume within a chamber using a mathematical model of regulatory mechanism flow characteristics and measurement of pressure in the fluid supply, chamber and fluid exhaust destination; and/or Manage the fluid volume within a chamber using flow velocity sensing to measure fluid flowing in and out.

The control system is preferably configured to:

Monitor the angle and/or position of one or more chambers directly. For example, the control system may comprise an accelerometer and compass to measure chamber position. The control system may comprise an internal rangefinder to measure chamber length. The control system may be configured to vary one or more chamber pressures and/or pressure ratios between chambers to drive the structure towards a target position; and/or Manage the ratio of pressures in opposing antagonistic chambers, in systems where the ratio of pressures controls the position directly; and/or Manage the pressure within chambers which are working against adjacent or nearby elastic elements, wherein the pressure within the chambers has a direct effect on position; and/or Use external cameras and machine vision techniques to measure the position of a corresponding chamber.

In one embodiment, the outer membrane of one or more chambers of the structure, for example the outer membrane of one or more chambers within a set of antagonistic chambers, comprises a pattern or visual markers which are configured to be distorted, for example visibly distorted when contacted by an external element, such as for example by a user or by any other suitable contact element. In one embodiment, the control system further comprises a camera system configured to detect distortion of a pattern or a visual marker of a chamber when distorted (i.e. when touched) by contact.

In one embodiment, the structure further comprises a modulated light source configured to be placed within the structure, for example within a cavity of a chamber. The light source may for example be an infra red or UV light source. In one embodiment, the control system further comprises a light sensor, preferably located within the structure, configured to be positioned such that in use the light sensor can detect reflected modulated light when an outer membrane of the structure is touched by an external element, such as for example by a user or by any other suitable contact element.

In one embodiment, the outer membrane of at least one chamber comprises a pattern or visual markers which are distorted, for example visibly distorted when contacted by a user. The control system preferably comprises a camera system configured to detect distortion of a pattern or a visual marker of at least one chamber when distorted on contact (i.e. when touched) by a contact element.

According to a second aspect of the present invention, there is provided an inflatable, moveable structure comprising:
  at least one chamber comprising a substantially inelastic outer membrane defining a cavity extending therebetween, and in which each cavity is configured in use to be in fluid communication with a fluid source, in which the outer membrane comprises a pattern or visual markers which are distorted, for example visibly distorted when contacted by a user; and
  a control system comprising a camera system configured to detect distortion of a pattern or a visual marker of a chamber when distorted on contact (i.e. when touched) by a contact element.

The structure may further comprise a fluid source configured to be placed in fluid communication with the at least one chamber to provide fluid into and/or receive fluid from the cavity.

The structure preferably further comprises a regulatory mechanism in communication with the or each chamber, in which the regulatory mechanism is configured to control fluid flow into or out of the corresponding cavity. The control system preferably further comprises at least one sensor, in which the at least one sensor comprises:
  at least one pressure sensor, the or each pressure sensor being located within a corresponding chamber and operable to determine the pressure of the fluid within the corresponding chamber and/or the pressure ratio of fluid within at least two chambers; and/or
  at least one spatial orientation sensor configured to determine the spatial orientation of the at least one chambers.

The control system is preferably operable to effect movement of the structure by controlling operation of the regulatory mechanism in response to one or more of the determined spatial orientation of the structure as determined by the spatial orientation sensor(s) and/or fluid pressure within the corresponding chamber(s) and/or pressure ratio of fluid within at least two chambers as determined by the pressure sensor(s).

According to a third aspect of the present invention, there is provided an inflatable, moveable structure comprising:
  at least one chamber comprising a substantially inelastic outer membrane defining a cavity extending therebetween, and in which each cavity is configured in use to be in fluid communication with a fluid source;
  a light source configured in use to be located within the cavity; and
  a control system comprising a light sensor configured to detect reflected modulated light when the outer membrane of the at least one chamber is distorted on contact (i.e. when touched) by a contact element.

The structure may further comprise a fluid source configured to be placed in fluid communication with the at least one chamber to provide fluid into and/or receive fluid from the cavity.

In one embodiment, the contact element may be a user or be any other suitable contact element, such as for example by a portion of a further structure or piece of equipment.

The structure preferably further comprises a regulatory mechanism in communication with the or each chamber, in which the regulatory mechanism is configured to control fluid flow into or out of the corresponding cavity. The control system preferably further comprises at least one sensor, in which the at least one sensor comprises:
  at least one pressure sensor, the or each pressure sensor being located within a corresponding chamber and operable to determine the pressure of the fluid within the corresponding chamber and/or the pressure ratio of fluid within at least two chambers; and/or at least one spatial orientation sensor configured to determine the spatial orientation of the at least one chambers.

The control system is preferably operable to effect movement of the structure by controlling operation of the regulatory mechanism in response to one or more of the determined spatial orientation of the structure as determined by the spatial orientation sensor(s) and/or fluid pressure within the corresponding chamber(s) and/or pressure ratio of fluid within at least two chambers as determined by the pressure sensor(s).

There is an issue associated with inflatable structures, and that is that during movement, for example when being subjected to a counterforce, slack appears in the outer wall and the structure loses its overall rigidity. For example, a single chamber cylinder may be shortened by application of a counterforce from for example an axial pull cord attached to one end. As soon as the pull force exceeds the tension force in the walls of the cylinder, the shape changes via the cylinder shortening, and the walls start to develop unsightly folds. The tension in the skin, or outer wall, at this point is essentially zero. As soon as slack appears, the chamber loses rigidity. The slack is free to move to any part of the chamber in response to any applied load. The resulting shape is indeterminate, it tends to be determined by small incidental forces, e.g. the weight of the fabric. This is a general feature of inflated chambers working against counterforces.

The present invention seeks to provide inflatable, moveable structures where there is no separation between the structure and the actuator.

Preferably, the outer membrane of the chambers forming the structure remains taut during movement and as such retains mechanical stiffness and a determinate shape over their shape range.

According to one embodiment, there is provided an inflatable, moveable structure comprising a plurality of elongate, hollow tubular members comprising a substantially inelastic outer membrane defining a cavity extending therebetween. Each tubular member preferably has a first end configured to be independently in communication with a fluid supply, and a closed second opposed end, defining a fluid conduit and a longitudinal axis extending therebetween. Each elongate hollow tubular member comprises at least one chamber extending outwardly from and along the length of the tubular member. The or each chamber is preferably in communication with the fluid conduit and one or more adjacent chambers when present. The plurality of elongate hollow tubular members are preferably configured in use to be positioned at or adjacent each other such that the longitudinal axes of the tubular members are aligned. The at least one chamber of each tubular member preferably extends outwardly away from the at least one chamber of adjacent elongate hollow tubular members.

In one embodiment, each chamber is in the form of a spike-shaped or lobe-shaped chamber, preferably aligned spike-shaped or lobe-shaped chamber, extending outwardly from and along the length of the tubular member.

Each hollow tubular member preferably defines a longitudinal axis. Each chamber, for example spike-shaped or lobe-shaped chamber, preferably extends outwardly from the hollow tubular member at an angle to, preferably substantially perpendicular to, the longitudinal axis thereof. A fluid flow path is preferably formed between the fluid conduit defined by the hollow tubular members and each chamber. Each elongate hollow tubular member may be adjoined to one or more other hollow tubular member. The pressure sensors are preferably located within each hollow tubular member and/or within one or more chambers extending therefrom.

The structure preferably further comprises a regulatory mechanism in communication with the or each chamber, in which the regulatory mechanism is configured to control fluid flow into or out of the corresponding cavity. The control system preferably further comprises at least one sensor, in which the at least one sensor comprises:

at least one pressure sensor, the or each pressure sensor being located within a corresponding chamber and operable to determine the pressure of the fluid within the corresponding chamber and/or the pressure ratio of fluid within at least two chambers; and/or at least one spatial orientation sensor configured to determine the spatial orientation of the at least one chambers.

The control system is preferably operable to effect movement of the structure by controlling operation of the regulatory mechanism in response to one or more of the determined spatial orientation of the structure as determined by the spatial orientation sensor(s) and/or fluid pressure within the corresponding chamber(s) and/or pressure ratio of fluid within at least two chambers as determined by the pressure sensor(s).

In use, fluid (for example gas (e.g. air) or liquid (e.g. water or oil) is introduced into the hollow tubular members. As the fluid enters the fluid conduit and passes into the plurality of chambers of each elongate tubular member, the corresponding tubular member is subject to bending forces, however this bending force is counteracted by the bending forces experienced by the other adjoined tubular members. As such, the overall movement of the inflatable structure can be selectively controlled by the control system independently controlling the regulatory mechanism, by for example opening and closing first and/or second valves or openings, to control the supply of fluid and for example the pressure within the chambers and/or ratio of the pressures between different chambers of each tubular member. During movement, the outer surface of the membrane remains taut.

In one embodiment, the structure further comprises a control system operable to independently control the supply of fluid from a fluid source to each elongate hollow tubular member.

It has been found that a simple inflated tube develops slack sides and an uncontrolled shape when shortened by an applied force (i.e. by pushing on an end). In order to provide an inflatable structure in which movement can be effected (in for example a longitudinal direction) whilst retaining a taut outer surface, it has been found that the provision of pleats and folds enables the outer membrane to remain taut even when the inflatable structure is shortened. Furthermore, the provision of pleats and folds makes the structure more elastic in response to external forces, both endwise compression and bending.

According to a further embodiment, there is provided an inflatable, moveable structure comprising an elongate inflatable member comprises a substantially inelastic outer member defining a cavity extending therebetween. The elongate inflatable member comprises a first end and an opposed second end defining a longitudinal axis extending therebetween. The elongate inflatable member is preferably configured to be in communication with a fluid supply. The elongate inflatable member preferably comprises at least one, for example a plurality of, circumferentially extending folds or pleats formed in a direction extending at an angle to the longitudinal axis of the elongate inflatable member. In one embodiment, the pleats or folds extend substantially perpendicular to the longitudinal axis of the inflatable member.

The structure preferably further comprises a regulatory mechanism in communication with the or each chamber, in which the regulatory mechanism is configured to control fluid flow into or out of the corresponding cavity. The control system preferably further comprises at least one sensor, in which the at least one sensor comprises:

at least one pressure sensor, the or each pressure sensor being located within a corresponding chamber and operable to determine the pressure of the fluid within the corresponding chamber and/or the pressure ratio of fluid within at least two chambers; and/or at least one spatial orientation sensor configured to determine the spatial orientation of the at least one chambers.

The control system is preferably operable to effect movement of the structure by controlling operation of the regulatory mechanism in response to one or more of the determined spatial orientation of the structure as determined by the spatial orientation sensor(s) and/or fluid pressure within the corresponding chamber(s) and/or pressure ratio of fluid within at least two chambers as determined by the pressure sensor(s).

The structure may further comprise a fluid source configured to be placed in fluid communication with the at elongate inflatable member to provide fluid into and/or receive fluid from the cavity defined therein.

Changes to the geometry of the pleats or folds, for example changes to the angle and/or depth) change the force-extension curve of the structure and so can be selected to provide predetermined movement of the structure.

It is to be understood that the elongate member may be straight or bent.

The present invention provides inflatable, moveable structures capable of providing a continuously taut outer surface during movement. The structure is capable of preserving, during movement, stiffness against off-axis forces.

In one embodiment, according to any aspect of the invention as described herein, the inflatable, moveable structure may comprise one or more pull cords configured in use to provide a counterforce to a corresponding chamber. The pull cord may be:

Wrapped around a chamber such that the cord is pulled as the chamber is inflated. Guides may be attached to the chamber to keep the cord in position laterally; or Passed into a chamber (for example a pleated chamber) which is configured to inflate longitudinally.

For example, the pull cord chamber may be located within the cavity of a corresponding inflatable chamber. The pull-cord chamber may comprise a substantially inelastic outer membrane defining an internal cavity in independent communication with the fluid supply. The pull cord chamber may comprise a pull-cord having a first end secured to a first end of a corresponding inflatable chamber, a second opposed end secured to a second opposed end of the inflatable chamber, and extending circumferentially around the pull-cord chamber.

For example, the pull cord chamber may be located adjacent the at least one inflatable chamber. The pull-cord chamber may comprise a substantially inelastic outer membrane defining an internal cavity in independent communication with the fluid supply. The pull cord chamber may comprise a pull-cord having a first end secured to a surface of the pull cord chamber and a second opposed end secured to an opposed surface of the corresponding inflatable chamber.

Pull cords located on the exterior of a structure can be aesthetically undesirable. In one embodiment, according to any aspect described herein, the structure may comprise one or more pull-cord chambers located within another chamber of the structure. The pull-cord chamber may be located within the chamber whose shape the pull-cord is to modify or within another chamber. To actuate, the pull-cord chamber must have a higher pressure than the outer chamber.

The inflatable, moveable structure may comprise:
a fluid supply;
at least one inflatable chamber comprising a substantially inelastic outer membrane defining a cavity, in which the at least one inflatable chamber is independently in communication with the fluid supply, in which the at least one inflatable chamber comprises a regulatory mechanism in communication with the or each chamber, in which the regulatory mechanism is configured to control fluid flow into or out of the corresponding cavity; and
at least one pull cord chamber located within the cavity of a corresponding inflatable chamber, in which the pull-cord chamber comprises a substantially inelastic outer membrane defining an internal cavity in independent communication with the fluid supply, and in which the pull cord chamber comprises a pull-cord having a first end secured to a first end of a corresponding inflatable chamber, a second opposed end secured to a second opposed end of the inflatable chamber, and extending circumferentially around the pull-cord chamber; and
a control system operable to independently control operation of the regulatory mechanism to supply fluid from the fluid supply to the inflatable chamber(s) and/or pull cord chamber(s) to effect movement of the at least one inflatable chamber.

The control system preferably further comprises at least one sensor, in which the at least one sensor comprises:

at least one pressure sensor, the or each pressure sensor being located within a corresponding chamber and operable to determine the pressure of the fluid within the corresponding chamber and/or the pressure ratio of fluid within at least two chambers; and/or at least one spatial orientation sensor configured to determine the spatial orientation of the at least one chambers.

The control system is preferably operable to effect movement of the structure by controlling operation of the regulatory mechanism in response to one or more of the determined spatial orientation of the structure as determined by the spatial orientation sensor(s) and/or fluid pressure within the corresponding chamber(s) and/or pressure ratio of fluid within at least two chambers as determined by the pressure sensor(s).

The moveable, inflatable structure may comprise:
a fluid supply;
at least one inflatable chamber comprising a substantially inelastic outer membrane defining a cavity, in which the at least one inflatable chamber is independently in communication with the fluid supply, in which the at least one inflatable chamber comprises a regulatory mechanism in communication with the or each chamber, in which the regulatory mechanism is configured to control fluid flow into or out of the corresponding cavity; and at least one pull cord chamber located adjacent the at least one inflatable chamber, in which the pull-cord chamber comprises a substantially inelastic outer membrane defining an internal cavity in independent communication with the fluid supply, and in which the pull cord chamber comprises a pull-cord having a first end secured to a surface of the pull cord chamber and a second opposed end secured to an opposed surface of the corresponding inflatable chamber; and a control system operable to independently control operation of the regulatory mechanism to control the supply of fluid from the fluid supply to the inflatable chamber(s) and/or pull cord chamber(s) to effect movement of the at least one inflatable chamber.

The control system preferably further comprises at least one sensor, in which the at least one sensor comprises:

at least one pressure sensor, the or each pressure sensor being located within a corresponding chamber and operable to determine the pressure of the fluid within the corresponding chamber and/or the pressure ratio of fluid within at least two chambers; and/or at least one spatial orientation sensor configured to determine the spatial orientation of the at least one chambers.

The control system is preferably operable to effect movement of the structure by controlling operation of the regulatory mechanism in response to one or more of the determined spatial orientation of the structure as determined by the spatial orientation sensor(s) and/or fluid pressure within the corresponding chamber(s) and/or pressure ratio of fluid within at least two chambers as determined by the pressure sensor(s).

In one embodiment, the structure comprises a plurality pull cord chambers, the supply of fluid to each pull cord chamber being independently controllable by the control system to effect movement , such as extension, contraction and tilting movement of the inflatable chamber(s).

The pull cord chamber is preferably a pleated chamber configured for longitudinal extension.

In one embodiment, the inflatable chamber(s) are supported on the pull cord chamber(s).

In one embodiment, the inflatable chamber(s) and the pull cord chamber(s) are configured in use to extend in a longitudinal direction.

The inflatable chamber(s) is preferably located adjacent to and spaced apart from (in the longitudinal direction) the pull cord chamber.

The inflatable, moveable structure may comprise:
an inflatable chamber comprising a substantially inelastic outer membrane defining a cavity extending therebetween;
a membrane extending between opposing surfaces of the inflatable chamber to divide the cavity into a first cavity portion and a second cavity portion;
at least one rigid portion located adjacent the outer membrane, and extending outwardly therefrom, in which the rigid portion(s) is in communication with a peripheral portion of the membrane;
in which each cavity portion is independently in fluid communication with a fluid source, and in which each cavity portion further comprises at least one regulatory mechanism in communication with the or each chamber, in which the regulatory mechanism is configured to control fluid flow into or out of the corresponding cavity; and a control system comprising:
a plurality of pressure sensors, each pressure sensor located within a corresponding cavity portion and operable to determine the pressure of the fluid within and/or the pressure ratios of the fluid between the corresponding cavity portions;
in which the control system is operable to control operation of the regulatory mechanism to independently control the flow of fluid into and/or out of a corresponding cavity portion to create predetermined movement of the rigid portion(s).

In one embodiment, the control system is operable to independently control the flow of fluid into a corresponding cavity portion to create angular movement of the rigid portion(s).

One motion that is desirable within an inflatable structure is the provision of a two-axis hinge.

The inflatable, moveable structure may comprise a plurality of opposed pleated bellows defining a plurality of chambers, in which the bellows are configured to be in communication with a fluid supply; and a control system operable to control the pressure and/or pressure ratios within chambers of the bellows.

The bellows are preferably formed from a substantially inelastic outer membrane defining cavities extending therebetween.

The structure may comprise two or three or four opposed bellows.

The pleating in the bellows surface provides elasticity and movement across the shape range of the bellows.

The overall position of the structure can be controlled either by controlling the ratio of pressures in adjacent opposed chambers or by increasing and/or decreasing pressures in order to achieve a target position.

The mechanical stiffness of the structure can be controlled by varying the average pressure in the chambers, so the structure can stay in the same position while varying the stiffness with respect to bending forces.

The inflatable, moveable structure may be a inflatable, twistable structure. The structure may comprise
an inflatable cylindrical chamber comprising a substantially inelastic outer membrane defining a first cavity;
an inflatable annulus chamber comprising a substantially inelastic outer membrane defining a second cavity, in which the annulus chamber extends circumferentially about the inflatable cylindrical chamber; and
a twist formed between the cylindrical chamber and the annulus chamber;
in which each chamber is configured to be independently in fluid communication with a fluid supply, and in which each chamber comprises a regulatory mechanism in communication with the chamber, in which the regulatory mechanism is configured to control fluid flow into or out of the corresponding cavity, and a pressure sensor configured to determine the fluid pressure within and/or pressure ratios between the corresponding cavity(ies); and a control system operable to independently control operation of the regulatory mechanism to supply of fluid to and/or release of fluid from each chamber, the pressure of fluid within the cavity of each chamber, and the pressure ratio of the fluid between the corresponding chambers.

The inflatable, moveable structure may be capable of inversion.

The inflatable, moveable structure may comprise:
an annular chamber comprising a continuous, substantially inelastic outer membrane;

a substantially inelastic inner membrane extending between opposed inner surfaces of the annular chamber, in which the inner membrane provides an aperture configured to enable the outer membrane to extend therethrough, in which the annular chamber defines a pair of cavities, each cavity extending between a corresponding portion of the outer membrane and the inner membrane;

a fluid supply in communication with each cavity of the annular chamber; and a control system to independently control the supply of fluid from the fluid supply to each cavity.

In one embodiment, the aperture is located substantially centrally.

The inflatable, moveable structure, capable of inversion, may comprise:

an annular chamber comprising a continuous, substantially inelastic outer membrane; and a base portion in communication with the ends of the outer membrane;

in which the annular chamber defines a cavity, the cavity extending between a corresponding portion of the outer membrane and the base portion;

a fluid supply in communication with the cavity of the annular chamber; and a control system to independently control operation of the regulatory mechanism to control the supply of fluid from the fluid supply to the cavity.

The inflatable, moveable structures described herein may comprise one or more chamber arrangements, in which each chamber arrangement comprises a plurality of chambers. Each chamber arrangement may be independently in communication with a fluid source. The or each chamber arrangement may be linked to or bear on, in use, a further chamber arrangement. For example, the inflatable moveable structure may comprise a plurality of layers of chamber arrangements.

The inflatable, moveable structure may comprise:

a fluid source;

a first chamber arrangement comprising a plurality of first chambers, each first chamber comprising a substantially inelastic outer membrane defining a cavity extending therebetween, in which each first chamber comprises a first end, and opposed second end and a longtiduinal axis extending therebetween, and in which the plurality of first chambers are arranged such that the longitudinal axes of each first chamber are aligned, and in which each cavity is in fluid communication with the fluid source, and in which one or more first chamber further comprises a first regulatory mechanism in communication with the first chamber, in which the first regulatory mechanism is configured to control fluid flow into or out of the corresponding cavity;

a second chamber arrangement comprising a plurality of second chambers, each second chamber comprising a substantially inelastic outer membrane defining a cavity extending therebetween, in which each second chamber comprises a first end, and opposed second end and a longtiduinal axis extending therebetween, and in which the plurality of second chambers are arranged such that the longitudinal axes of each second chamber are aligned, and in which each cavity is in fluid communication with the fluid source, and in which one or more second chamber further comprises a second regulatory mechanism in communication with the second chamber, in which the second regulatory mechanism is configured to control fluid flow into or out of the corresponding cavity in which the first chamber arrangement is configured in use such that one or more first chamber is linked to or to bears on a corresponding second chamber provided by the second chamber arrangement, in which the first and second chamber arrangements are independently in fluid communication with the fluid source, and a control system comprising at least one of:

a plurality of pressure sensors, at least one pressure sensor being located within a corresponding chamber of the first chamber arrangement, and at least one pressure sensor being located with a corresponding chamber of the second chamber arrangements, and operable to determine the pressure of the fluid within and/or the pressure ratio of the fluid between the corresponding chambers of the first and second chamber arrangements.

The control system is preferably operable to effect movement of the structure by controlling operation of the first and/or second regulatory mechanisms in response to one or more of the fluid pressure within the corresponding chamber(s) and/or pressure ratio of fluid within at least two chambers as determined by the pressure sensor(s).

Preferably, the first chambers and second chambers are independently in fluid communication with the fluid source.

In one embodiment, a support substrate, for example a membrane (for example an inelastic membrane) may be positioned between the first and second chamber arrangements. In one embodiment, one or more (preferably each) of the first and second chamber arrangements may be linked to or bear on the support substrate.

The one or more chambers of a first chamber arrangement may be linked to a corresponding chamber within the second chamber arrangement by any suitable means such as for example by adhesive, sewing, heat sealing or RF welding.

The or each chamber arrangement may comprises a plurality of aligned elongate chambers. The or each chamber arrangement may be elongate in shape, having a first end and an opposed second end, defining a longitudinal axis extending therebetween. The or each chamber arrangement may further comprise side portions extending between the first and second ends thereof. In one embodiment, the longitudinal axis of the chambers may extend at an angle to the longitudinal axis of the chamber arrangement. Preferably. The longitudinal axes of the first chambers are aligned with the longitudinal axes of the second chambers. In one embodiment, the or each arrangement comprises a single chamber extending between opposed side portions thereof. In one embodiment, the or each arrangement comprises a plurality of chambers extending between opposed side portions thereof, in which the longitudinal axes of the plurality of chambers is aligned between the opposed side portions.

The chambers within the first chamber arrangement may form antagonistic pairs of chambers with corresponding chambers within the second chamber arrangement.

The shape and/or dimensions of the chambers within a chamber arrangement may vary.

The shape and/or dimensions of chambers may vary between the first and second chamber arrangements. For example, the shape and/or dimensions of chambers within aligned/corresponding portions of the first and second chamber arrangements may vary. The shape and/or dimensions of chambers may be identical between the first and second arrangements, for example the shape and/or dimensions of chambers within aligned/corresponding portions of the first and second chamber arrangements may be identical.

In one embodiment, the transverse dimensions of the chambers may decrease between a first end and the second opposed end of a chamber arrangement.

By varying the pressure ratio within the chambers of the first and second chamber arrangements, the shape of the resultant structure can be changed and controlled. For example, the degree of curvature of the structure can be varied and controlled.

The inflatable, moveable structure comprising:
a fluid source;
at least one pair of antagonistic chambers, the first antagonistic chamber is formed between a first substantially inelastic outer membrane joined to a substantially inelastic inner membrane, and the second antagonistic chamber formed between a second substantially inelastic outer membrane joined to the substantially inelastic inner membrane, in which each of the first and second outer membranes are larger in dimension to the inner membrane, and in which each of the first and second antagonistic chamber is in independent fluid communication with the fluid source, and in which each chamber further comprises a regulatory mechanism in communication with the corresponding chamber, in which the regulatory mechanism is configured to control fluid flow into or out of the corresponding cavity; and
a control system comprising at least one of:
a plurality of pressure sensors, each pressure sensor being located within a corresponding first or second antagonistic chamber and operable to determine the pressure of the fluid within the corresponding chamber and/or the pressure ratio between the first and second antagonistic chambers.

The control system is preferably operable to effect movement of the structure by controlling operation of the regulatory mechanism in response to one or more of the fluid pressure within the corresponding chamber(s) and/or pressure ratio of fluid within at least two chambers as determined by the pressure sensor(s).

The regulatory mechanism may for example by a first valve located on and extending through the outer membrane. Preferably, the structure further comprises a further regulatory mechanism (for example at least one second valve) located between the fluid source and at least one chamber, preferably each chamber, of the or each pair of antagonistic chambers.

The outer membranes may be identical in size and shape. In one embodiment, the outer membranes may differ in one or both of size and/or shape.

Preferably at least one, preferably each of the outer membranes is at least 10%, preferably at least 50%, preferably at least 100%, preferably at least 150%, preferably at least 200%, for example about 250% larger than the inner membrane. Preferably at least one, preferably each of the outer membranes is no more than 500%, preferably no more than 400%, for example no more than 300% larger than the inner membrane. Preferably at least one, preferably each of the outer membranes is between 10% and 500% larger than the inner membrane.

The aspect ratio is defined as being the ratio of the dimension of the inner membrane to the corresponding dimension of the outer membrane. The aspect ratio of the chamber(s) of the or each pair of antagonistic chambers may vary.

Each outer membrane is preferably adjoined to the inner membrane at or adjacent the periphery thereof. Each outer membrane is also preferably joined at a plurality of spaced apart locations, in for example a grid arrangement, across the adjacent surface of the inner membrane. The number of spaced apart join locations may vary and the location of each join location on the inner membrane may vary. The grid arrangement may for example comprises a regular arrangement in which the joins are all aligned in a first direction and also in a second orthogonal direction along the surface of the inner membrane. In some embodiments, the grid arrangement may for example be an irregular arrangement. Preferably the grid arrangement of spaced apart locations of joins for a first outer membrane is the same as the grid arrangement of spaced apart locations of joins for the second outer membrane. The first outer membrane is preferably joined to the inner membrane in a substantially mirror image to the second outer membrane.

The inner membrane may be substantially centrally located relative to one or each outer membrane. The inner membrane may be offset from a central location relative to one or each outer membrane. Preferably, the shape of the outer membranes is the same as the shape of the inner membrane. It is however to be understood that the shapes of the membranes may vary depending on the particular requirements.

In one embodiment, the outer membrane(s) are substantially rectangular or square in shape. In one embodiment, the inner membrane is substantially rectangular or square in shape. It is however to be understood that the shapes of the membranes may vary depending on the particular requirements.

The shape of the resultant structure can be controlled and varied. For example, the ratio of the dimensions of the outer to inner membrane can be varied to alter the maximum curvature of the resultant structure. The aspect ratio of the grid arrangement of locations of joins controls the direction of curvature. The spacing between the joins on the grid arrangement controls the thickness of the inflated structure.

The inflatable, moveable structure may comprise:
a fluid source;
a first chamber, preferably an elongate first chamber, comprising a substantially inelastic outer membrane defining a first cavity extending therebetween, in which the first chamber comprises a first end, a second opposed end and defines a first elongate axis extending therebetween, in which the first cavity is in fluid communication with the fluid source, and in which the or each chamber further comprises a first regulatory mechanism in communication with the corresponding chamber, in which the first regulatory mechanism is configured to control fluid flow into or out of the corresponding cavity;
at least one, preferably a plurality of, second chamber in fluid communication with and extending from a first end of the first chamber and at an angle to the elongate axis of the first chamber;
a third chamber having an annular shape and positioned on and to surround the first end of the first chamber and at least a portion of the second chamber, and a second regulatory mechanism in communication with the third chamber, in which the second regulatory mechanism is configured to control fluid flow into or out of the cavity thereof,
a control system comprising at least one of:
a plurality of pressure sensors, each pressure sensor located within at least the first chamber and the third chamber (preferably located within each of the first, second and third chambers), and operable to determine the pressure of the fluid within the corresponding chamber and/or the pressure ratio between chambers, in which the control system is operable to effect movement of the second chamber(s) towards or away from the elongate axis of the first chamber by independently controlling operation of the first and second regulatory mechanism in response to one or more of the fluid pressure within the corresponding chamber(s) and/or pressure ratio of fluid within at least two chambers as determined by the pressure sensor(s).

When the pressure within the third chamber exceeds a predetermined value, the third chamber bears on the second chambers sufficiently, at the join between the first and second chambers, to bring the second chambers, in particular the elongate axes defined between opposed ends thereof, towards, for example into alignment with, the elongate axis defined by the first chamber into the "closed" position.

When the pressure within the third chamber is less than a predetermined value, the second chambers separate from each other, and extend away from the elongate axis defined by the first chamber to move towards their original, unpressurized position, and bear against on the third chamber into the "open" position. This movement can be controlled and repeated by the control system to provide a smooth open and closing visual effect.

In one embodiment, the second chamber further comprises a valve located on and extending through the outer membrane thereof, in which the control system is operable to control operation of the valve.

The inflatable, moveable structure may comprise:
a fluid source;
at least one set of antagonistic chambers, in which the first antagonistic chamber is formed between a first substantially inelastic outer membrane joined to a substantially inelastic inner membrane, and the second antagonistic chamber is formed between a second substantially inelastic outer membrane joined to the substantially inelastic inner membrane, in which each of the first and second outer membranes are larger in dimension to the inner membrane, and in which each of the first and second antagonistic chamber is in independent fluid communication with the fluid source, and in which each chamber further comprises a regulatory mechanism in communication with the corresponding chamber, in which the regulatory mechanism is configured to control fluid flow into or out of the corresponding cavity; and
a control system comprising at least one of:
a plurality of pressure sensors, each pressure sensor being located within a corresponding first or second antagonistic chamber and operable to determine the pressure of the fluid within the corresponding chamber and/or the pressure ratio between the first and second antagonistic chambers,
in which the control system is operable to control operation of the regulatory mechanism of the or each set of antagonistic chambers in response to one or more of the fluid pressure within the corresponding chamber(s) and/or pressure ratio of fluid within at least two chambers as determined by the pressure sensor(s) such that a first chamber within the or each set of antagonistic chambers acts in opposition to the other chamber(s) within the corresponding set of antagonistic chambers.

The outer membrane(s) may be longer in length than the inner membrane. The structure may be an elongate structure.

The outer membrane(s) may be joined along the periphery thereof to the inner membrane. The outer membrane(s) may be pleated along the length thereof.

In use, the control system provides fluid into a corresponding chamber of the pair of antagonistic chambers. As the fluid (and pressure) increases within a first chamber, and the fluid (and pressure) decreases within the second chamber of a pair of antagonistic chambers, the first chamber extends in length and bears on the second chamber which contracts, causing the structure to bend. The degree of bend of the structure may be controlled by the ratio of lengths between the outer membrane and inner membrane and by the ratio of pressures within the set of antagonistic chambers.

According to a further aspect of the present invention, there is provided a method of manufacturing an inflatable, moveable structure as herein defined comprising:
obtaining at least one chamber comprising a substantially inelastic outer membrane defining a cavity extending therebetween, and in which the or each chamber further comprises a regulatory mechanism in communication with the corresponding chamber, in which the regulatory mechanism is configured to control fluid flow into or out of the corresponding cavity;
obtaining a control system comprising at least one of:
a plurality of pressure sensors, and locating each pressure sensor within a corresponding chamber operable to determine the pressure of the fluid within the corresponding chamber and/or the pressure ratio of fluid within at least two chambers; and/or
at least one spatial orientation sensor configured to determine the spatial orientation of the at least one chambers;
and placing a fluid source in communication with the or each cavity of the at least one chamber;
in which the control system is operable to effect movement of the structure by controlling operation of the regulatory mechanism in response to one or more of the determined spatial orientation of the structure as determined by the spatial orientation sensor(s) and/or fluid pressure within the corresponding chamber(s) and/or pressure ratio of fluid within at least two chambers as determined by the pressure sensor(s).

BRIEF DESCRIPTION OF FIGURES

FIGS. 1A and 1B show a set of two antagonistic chambers of an inflatable, moveable structure according to a first embodiment of the present invention;

FIGS. 2A and 2B show antagonistic chambers of an inflatable, moveable structure according to a second embodiment of the present invention;

FIGS. 10A-C are schematic illustrations of cross-sectional views of an inflatable, moveable structure according to a further embodiment of the present invention.

FIGS. 13A to 13D are schematic illustrations of one embodiment of the inflatable, moveable structure according to one embodiment of the present invention;

FIGS. 14A to 14C are schematic illustrations of one embodiment of the inflatable, moveable structure according to one embodiment of the present invention; and FIGS. 15A to 15C are schematic illustrations of one embodiment of the inflatable, moveable structure according to one embodiment of the present invention.

DETAILED DESCRIPTION

Figure 2B:
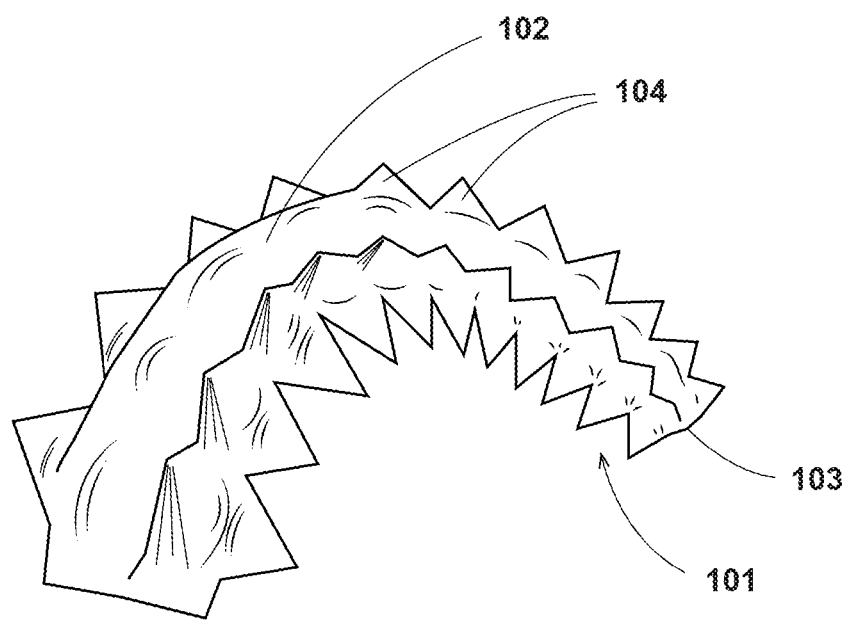

With reference to FIGS. 1A and 1B, the inflatable, moveable structure 1 comprises two antagonistic chambers. The first antagonistic chamber 2A is substantially cylindrical in shape when inflated. The second antagonistic chamber 2B is substantially annular in shape and extends peripherally around the first antagonistic chamber to provide a substantially spherical chamber when inflated (FIG. 1B).

Each chamber 2A, 2B of the structure comprises an inelastic, outer membrane defining a cavity (FIG. 16) extending therebetween, in which the cavity is in fluid communication with a fluid supply (FIG. 16), for example a pressurised air supply. Each chamber 2A, 2B further comprises a first valve extending through the outer membrane thereof. The structure further comprises a second valve located between the fluid supply and the corresponding chamber.

The structure 1 further comprises a control system (FIG. 16) comprising a first pressure sensor (FIG. 16) in communication with a cavity of the first chamber 2A and a second pressure sensor (FIG. 16) in communication with a cavity of the second chamber 2B. Each pressure sensor is configured to monitor the pressure within the cavity of the corresponding chamber 2A, 2B.

The control system (FIG. 16) further comprises a spatial orientation sensor (FIG. 16) configured in use to determine the spatial orientation of the first and second chambers 2A, 2B.

The control system is operable to independently move the first and/or second valve to an open position or to a closed position, or to any position therebetween, in response to the determined pressure and/or pressure ratio of the fluid within the corresponding chamber(s) (as determined by the pressure sensor(s)) and/or by the spatial orientation of the chambers (as determined by the spatial orientation sensor).

In use, as shown in FIG. 1A, the control system (FIG. 16) independently and selectively supplies fluid into the cavity of the first antagonistic chamber 2A whilst the second chamber 2B is deflated. The first valve of the first antagonistic chamber 2A is closed and the first valve of the second antagonistic chamber 2B is open. The supply of fluid causes the first antagonistic chamber 2A to inflate and lengthen along the axis of the cylindrical chamber while the outer, second antagonistic chamber 2B is deflated providing a taut outer surface of the structure. The antagonistic chambers 2A, 2B are sized such that the second chamber 2B (when deflated) can be lengthened, in response to inflation of the first chamber 2A, to enable the first chamber 2A to be fully inflated and to reach its full extension. The control system is then operable to open the first valve of the first chamber 2A and to close the first valve of the second chamber 2B. The control system then independently and selectively supplies fluid into the cavity of the second antagonistic chamber 2B creating a pulling force as the spherical second cavity is inflated, thereby shortening the length of the first antagonistic chamber 2A and causing fluid to exit the cavity of the first chamber 2A via the first valve. The control system may be operable to repeat the sequence of inflating the first chamber 2A while deflating the second chamber 2B, and then inflating the second chamber 2B while partially deflating the first chamber 2A to provide visible, smooth movement of the structure. It is to be understood that the pressure sensors and spatial orientation sensor on the first and second chambers are operable to enable the control system to control the timing of and degree of opening of corresponding valves and the supply of fluid to a corresponding cavity of a chamber. The control system enables the structure to be moved smoothly between the position of FIG. 1A and the position of FIG. 1B whilst retaining a taut, outer surface.

FIGS. 1A and 1B are illustrative of an embodiment of the present invention which provides an inflatable, moveable structure.

With reference to FIGS. 2A and 2B, the inflatable, moveable structure 101 provides a continuously taut outer surface of the structure during movement of the structure. The structure 101 comprises a plurality of elongate, hollow tubular members 102, for example two or three tubular members. Each tubular member 102 has a first end configured to be independently in communication with a fluid supply (FIG. 16), and a closed second opposed end 103, defining a fluid conduit extending therebetween. Each elongate tubular member 102 comprises a plurality of chambers 104 formed by an outer membrane 105 in the form of aligned spike-shaped or lobe-shaped chambers extending outwardly from and along the length of the tubular member 102. It is however to be understood that the chambers 104 may have any suitable shape and are not limited to being spike- or lobe-shaped. Each chamber 104 is in communication with adjacent chambers and the fluid conduit. The plurality of elongate tubular members 102 are positioned at or adjacent each other such that the longitudinal axes of the tubular members are aligned, and the spike-shaped or lobe-shaped chambers 104 of each tubular member 102 extend outwardly away from the spikes or lobe spike-shaped or lobe-shaped chambers of the adjacent tubular members.

In use, fluid, for example pressurised air is introduced into the plurality of tubular members 102, thereby inflating the chambers 104 creating bending effects. The bending effects created within a first tubular member 102 are countered by the bending effect in a different direction created within a different tubular member. By selectively varying the pressure within the chambers 104, i.e. by varying fluid flow into these chambers 104 within each tubular member 102, the movement of the structure can be smoothly controlled whilst achieving a taut outer membrane.

Figure 3:
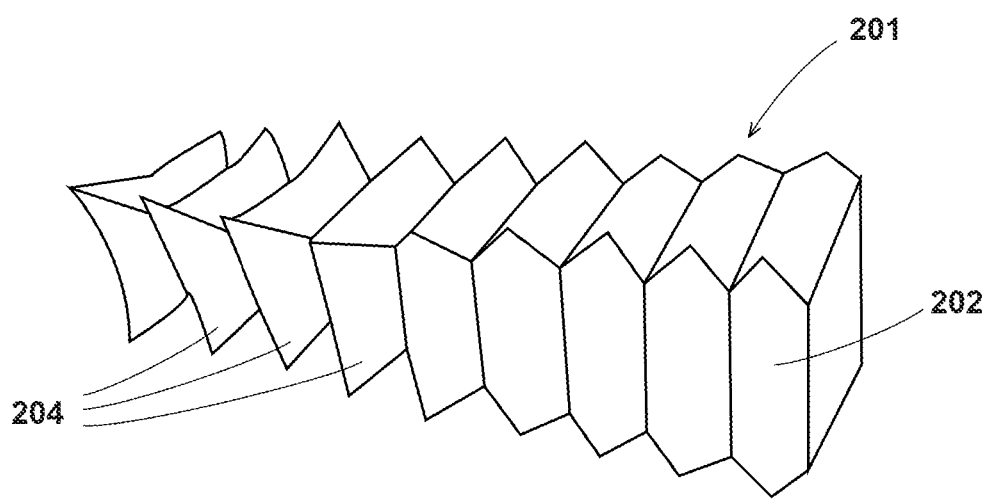
FIG. 3 is a photograph of an inflatable, moveable structure according to a third embodiment of the present invention.
Figure 16A:
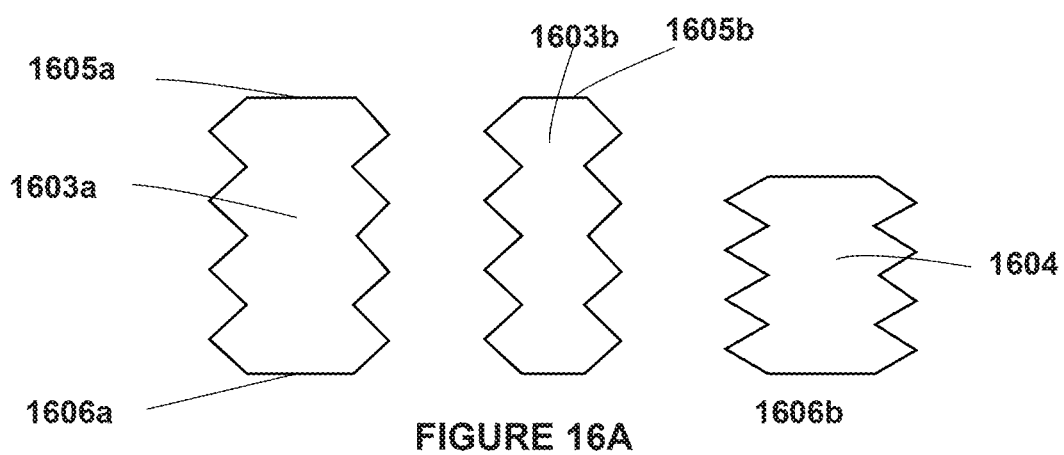
FIG. 16 is a block diagram of the inflatable, moveable structure.
Figure 16B:
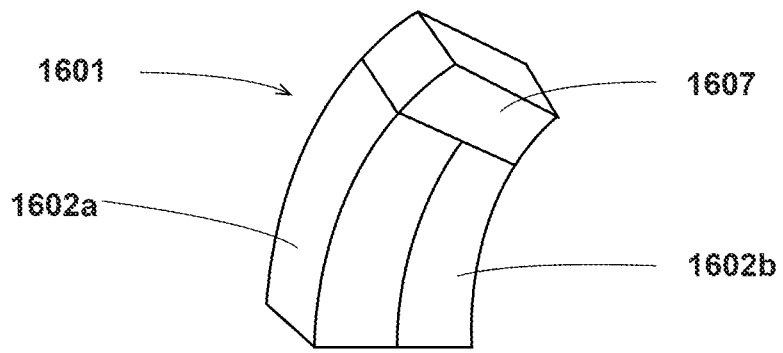
Figure 16:
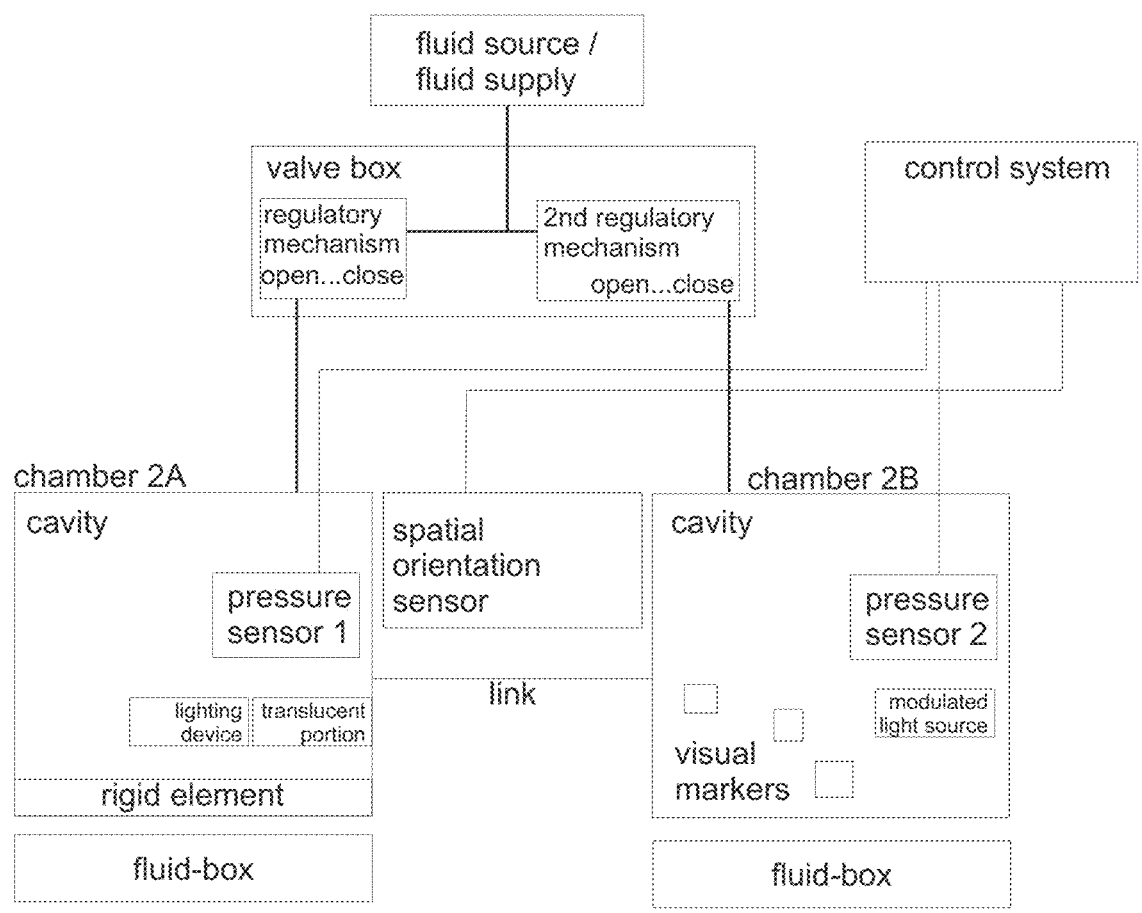

With reference to FIG. 3, the inflatable, moveable structure 201 comprises an elongate inflatable member 202 configured to be in communication with a fluid supply (FIG. 16). The elongate inflatable member 201 comprises a plurality of circumferentially extending folds or pleats 204 formed in a direction extending substantially perpendicular to the longitudinal axis of the inflatable member 202.

It has been found that a simple inflated tube develops slack sides and an uncontrolled shape when shortened by an applied force (i.e. by pushing on an end). In order to provide an inflatable structure in which movement can be affected (in for example a longitudinal direction) whilst retaining a taut outer surface, it has been found that the provision of pleats and folds 204 enables the outer membrane of the structure to remain taut even when the inflatable structure is shortened. Furthermore, the provision of pleats and folds makes the structure more elastic in response to external forces, both endwise compression and bending.

Figure 4A:
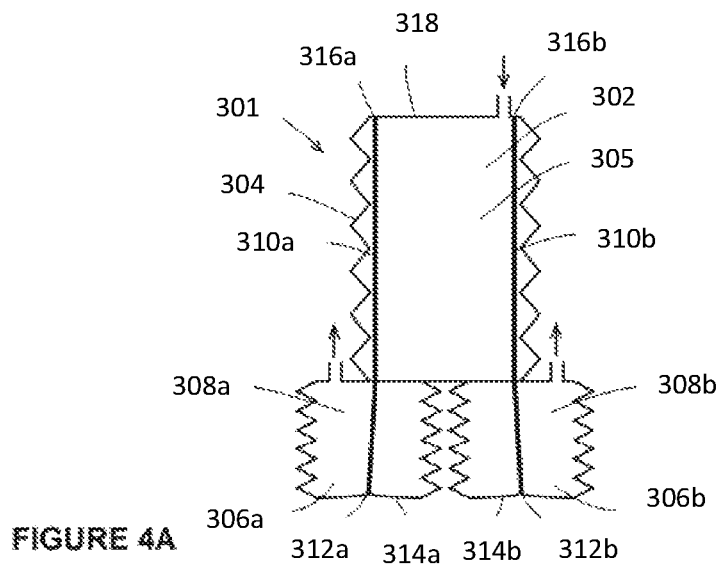
FIGS. 4A-C are schematic illustrations of an inflatable, moveable structure according to a further embodiment of the present invention.
Figure 4B:
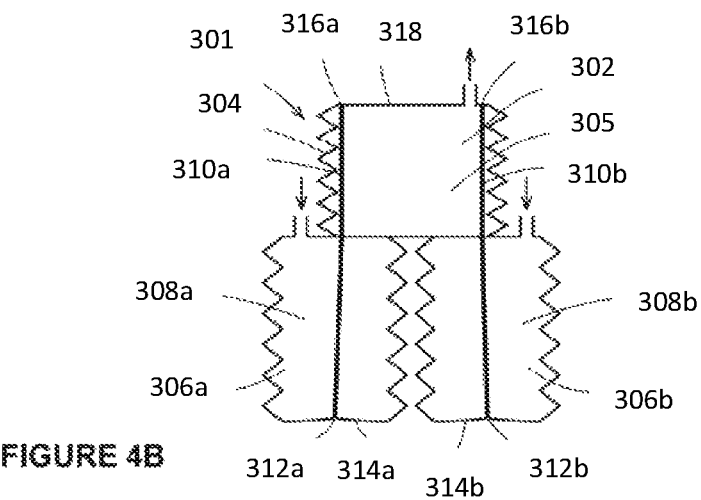
Figure 4C:
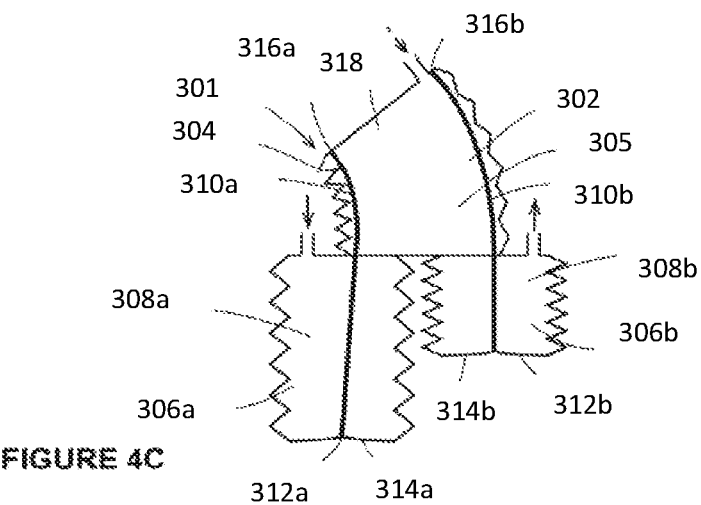

With reference to FIGS. 4A to 4C, the inflatable, moveable structure 301 comprises a fluid supply (FIG. 16) and an inflatable chamber 302 comprising an outer membrane 304 defining a cavity 305. The inflatable chamber 302 is in communication with the fluid supply (FIG. 16). The inflatable chamber 302 comprises a first valve extending through the outer membrane 304. The structure 301 further comprises two spaced apart pull cord chambers 306a, 306b located adjacent the inflatable chamber 302. In this embodiment, the pull cord chambers 306a,b are located beneath the inflatable chamber 302 and located adjacent opposing sides thereof. The pull-cord chambers 306a,b each defines an internal cavity 308a,b in communication with a fluid supply (FIG. 16). The pull cord chamber 306a,b comprises a pull-cord 310a,b having a first end 312a,b secured to a surface 314a,b of the pull cord chamber 306a,b, and a second opposed end 316a,b secured to an opposed surface 318 of the a corresponding inflatable chamber 302. The structure 301 further comprises a control system operable to control the supply of fluid from the fluid supply to the inflatable chamber(s) and/or pull cord chamber(s) to effect movement of the at least one inflatable chamber.

It can be seen in FIG. 4A that fluid is being supplied into the inflatable chamber 302 causing elongate extension of the chamber 302. Conversely, as the inflatable chamber 302 extends and reaches full extension of the pull cord 310a,b, the inflatable chamber 302 pushes against the pull cord chambers 306a,b causing fluid to be released from the cavities 308a,b of the pull cord chambers 306a,b. In order to cause movement of the inflatable chamber 302 in the longitudinal direction, fluid may be supplied to the pull cord chambers 306a,b, as shown in FIG. 4B creating a pressure force on the inflatable chamber 302 causing contraction thereof and release of fluid. By expanding and contracting the pull cord chamber 306a,b movement of the inflatable chamber 302 in the longitudinal direction thereof can be effected. FIG. 4C illustrates the effect of creating independent control of the inflation/deflation of the pull cord chamber 306a,b. It can be seen that the control system can be operated to create tilting movement of the inflatable chamber 302.

Figure 5A:
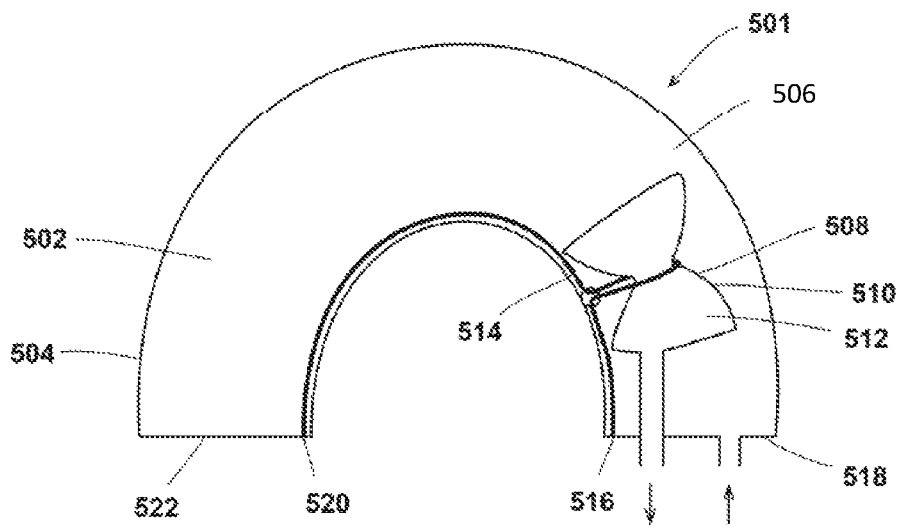
FIGS. 5A-B are schematic illustrations of an inflatable, moveable structure according to a further embodiment of the present invention.
Figure 5B:
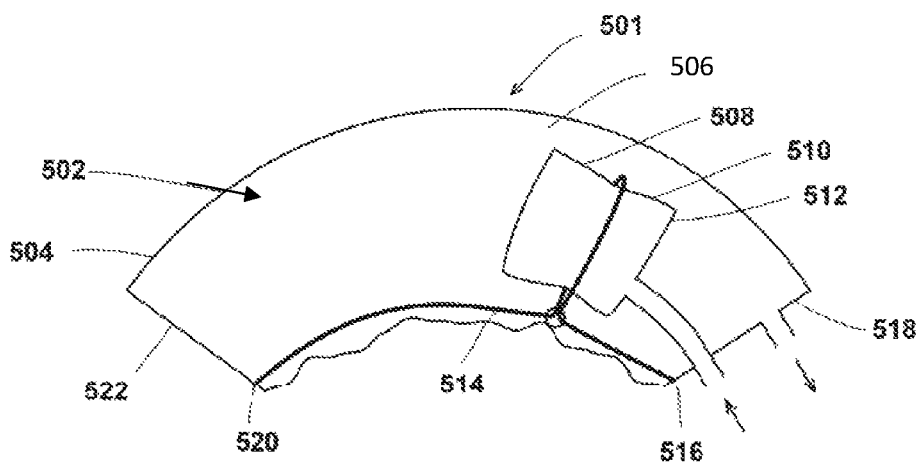

With reference to FIGS. 5A and 5B, the inflatable, moveable structure comprises a fluid supply and an inflatable chamber 502 comprising an outer membrane 504 defining a cavity 506. The inflatable chamber 502 is independent in communication with the fluid supply. The inflatable chamber comprises a first valve extending through the outer membrane 504. The structure further comprises a pull cord chamber 508 located within the cavity 506 of the inflatable chamber 502. The pull-cord chamber 508 comprises an outer membrane 510 defining an internal cavity 512 in independent communication with a fluid supply. The pull cord chamber 508 comprises a pull-cord 514 having a first end 516 secured to a first end 518 of the inflatable chamber 502, a second opposed end 520 secured to a second opposed end 522 of the inflatable chamber 502, and extending circumferentially around the pull-cord chamber 508. The structure further comprises a control system operable to independently control the supply of fluid from the fluid supply to the inflatable chamber(s) and/or pull cord chamber(s) to effect movement of the at least one inflatable chamber. It can be seen from FIG. 5A that in order to extend the inflatable chamber 502, the pull cord chamber 508 is deflated, thereby relaxing the pull cord 514 during inflation and extension of the chamber 502. In order to contract the inflatable chamber 502, the control system causes inflation of the pull cord chamber 508, causing the dimensions of the chamber 508 to expand, thereby causing the ends of the pull cord to be pulled together facilitating contraction of the inflatable chamber 502.

The structure may further comprise one or more lateral guides within the cavity to prevent unintended lateral movement of the pull cord during movement of the structure.

Figure 6A:
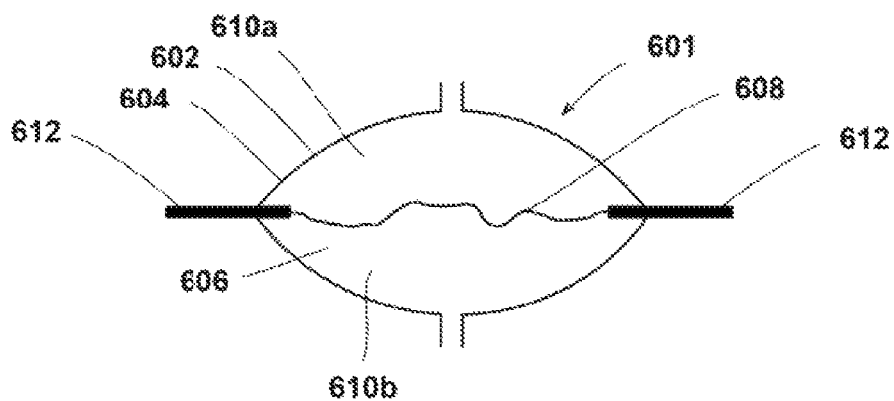
FIGS. 6A-C are schematic illustrations of an inflatable, moveable structure according to a further embodiment of the present invention.
Figure 6B:
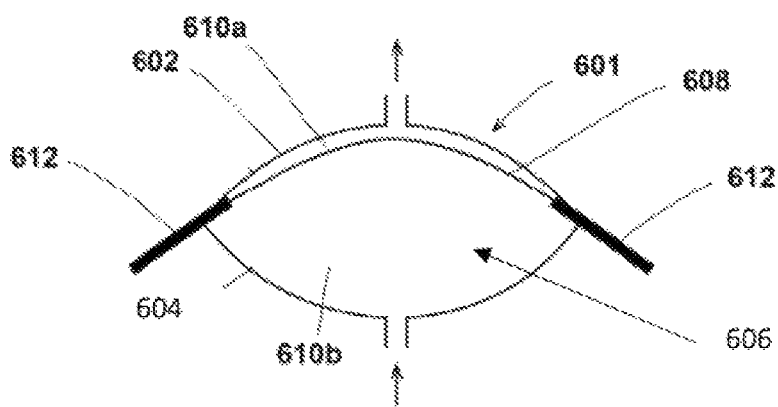
Figure 6C:
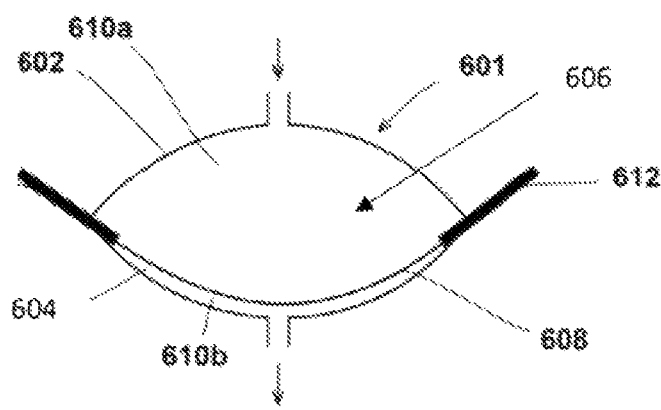

With reference to FIGS. 6A-C, the inflatable, moveable structure 601 comprises an inflatable chamber 602 comprising a substantially inelastic outer membrane 604 defining a cavity 606 extending therebetween. A membrane 608 extends between opposing surfaces of the inflatable chamber 602 to divide the cavity 606 into a first cavity portion 610a and a second cavity portion 610b. The membrane 608 extends beyond at least one pair of opposing surfaces of the outer membrane 604 to provide at least one pair of membrane portions 612a,b. Each cavity portion 610a,b is independently in fluid communication with a fluid source. Each cavity portion 610a,b further comprises at least one first valve located on and extending through the outer membrane 604. The structure 601 further comprises a control system comprising: a plurality of pressure sensors, each pressure sensor located within a corresponding chamber portion and operable to determine the pressure of the fluid within the corresponding chamber. The control system is operable to independently control the flow of fluid into a corresponding cavity portion to create movement of the membrane portions. As shown in FIGS. 6A-C, the central membrane moves depending on the pressure difference created between the cavity portions 610a,b. As a result of movement of the membrane, the membrane portions 612 also move creating a flipper effect. The membrane portions 612 may be stiff or semi flexible elements.

Figure 7A:
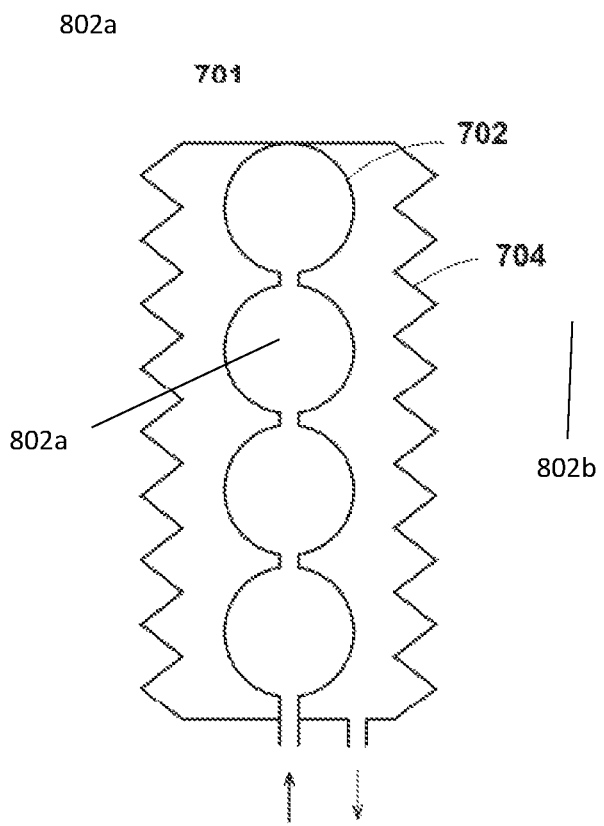
FIGS. 7A-B are schematic illustrations of an inflatable, moveable structure according to a further embodiment of the present invention.
Figure 7B:
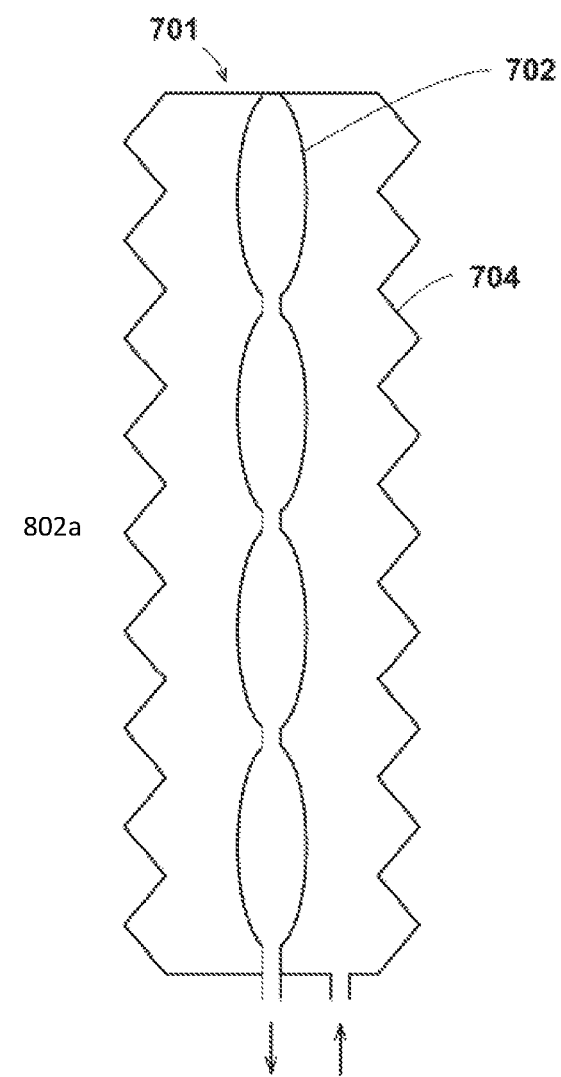
Figure 8A:
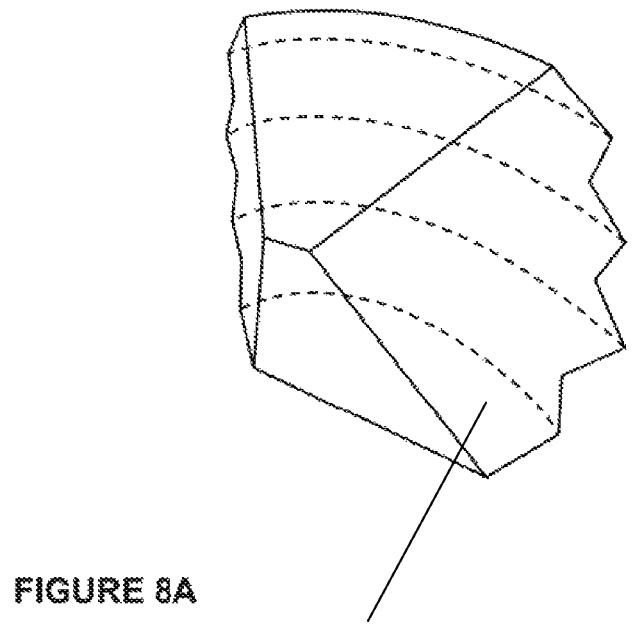
FIGS. 8A-D are schematic illustrations of an inflatable, moveable structure according to a further embodiment of the present invention.
Figure 8B:
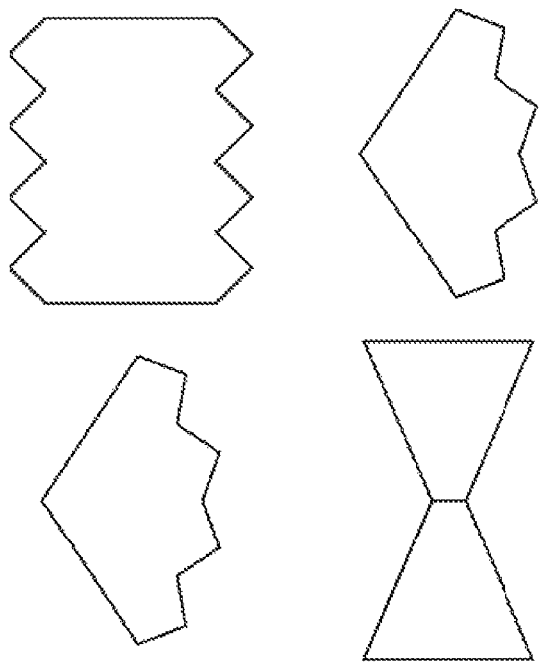
Figure 8C:
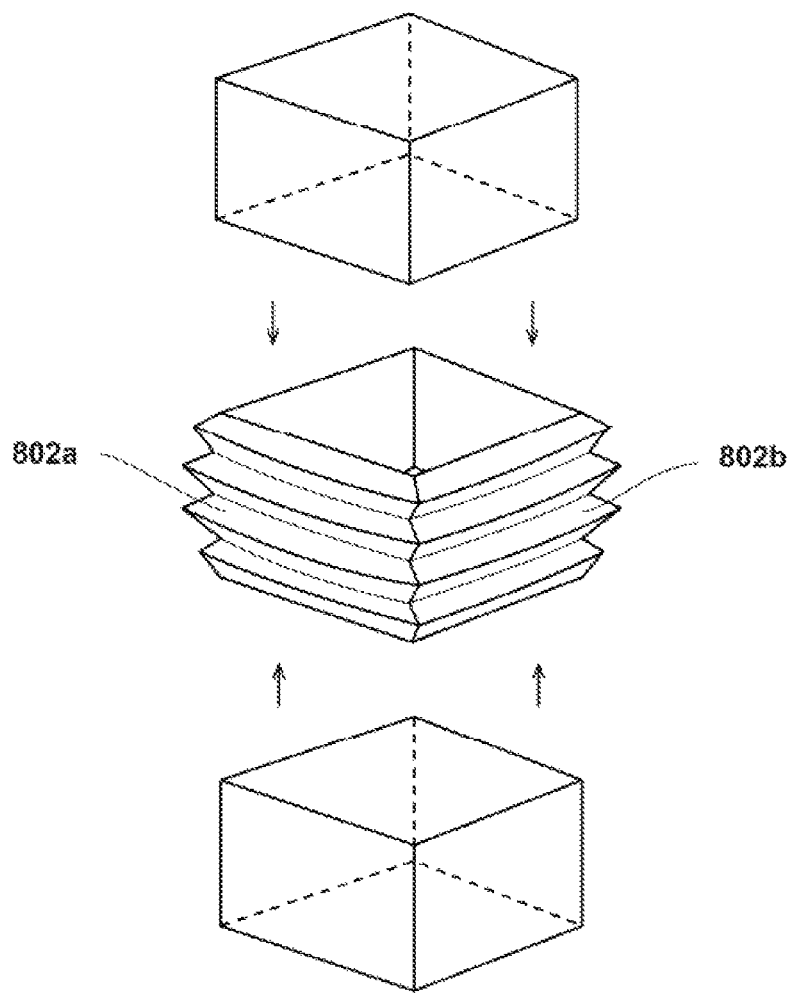
Figure 8D:
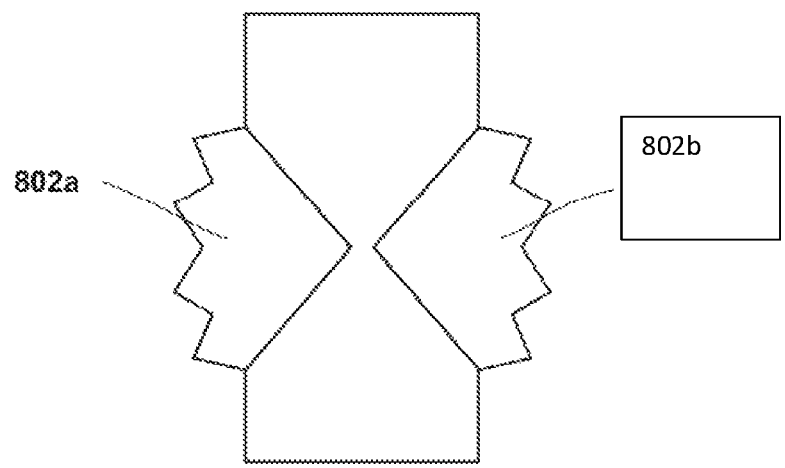

FIGS. 7A-B illustrate a further embodiment which operates in a similar manner to the embodiment of FIG. 1. The structure 701 comprises an internal inflatable pulling chamber 702 consisting of one or more substantially spherical chambers connected by tubular members to form in effect a string. The internal inflatable pulling chamber 702 is located inside an external inflatable pushing element which is provided as an inflatable cylinder, for example an inflatable pleated cylinder. The internal inflatable pulling chamber 702 and external inflatable pushing chamber 704 form an antagonistic pair. Each chamber 702, 704 is independently connected to a fluid supply. A control system controls the supply of fluid to the corresponding chamber, the pressure within the chamber(s) and the ratio of pressures within the chambers. Inflation and extension of the external chamber 704 causes deflation and extension of the inner chamber 702. Conversely, inflation and contraction of the inner chamber 702 causes contraction and deflation of the external chamber 704.

With reference to FIGS. 8A-D, there is provided an inflatable, moveable structure 801 comprising a 4-way pleated bellow joint, comprising two pairs of opposed pleated bellows 802a, 802b. It is to be understood that a structure may include any suitable number of pleated bellows, for example 3 or 4. The bellows 802a, 802b are configured to be in communication with a fluid supply (FIG. 16); and a control system (FIG. 16) operable to control the pressure and/or pressure ratios within chambers of the bellows. The pleating in the bellows surface provides elasticity and movement across the shape range of the bellows. The overall position of the structure 801 can be controlled either by controlling the ratio of pressures in adjacent opposed chambers or by increasing and/or decreasing pressures in order to achieve a target position. The mechanical stiffness of the structure 801 can be controlled by varying the average pressure in the chambers, so the structure can stay in the same position while varying the stiffness with respect to bending forces.

Figure 9A:
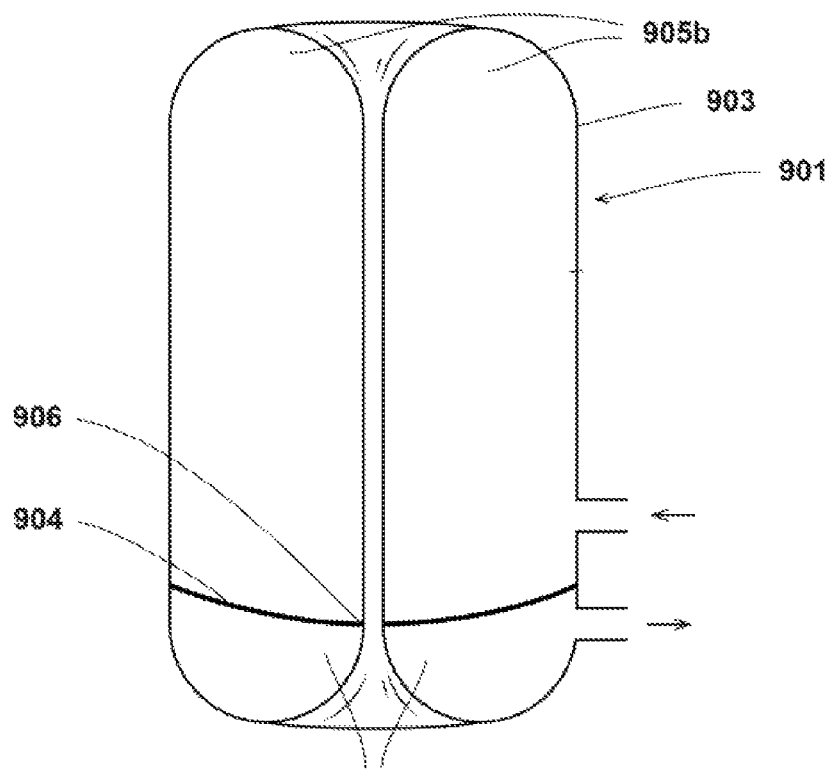
FIGS. 9A-B are schematic illustrations of cross-sectional views of an inflatable, moveable structure according to a further embodiment of the present invention.
Figure 9B:
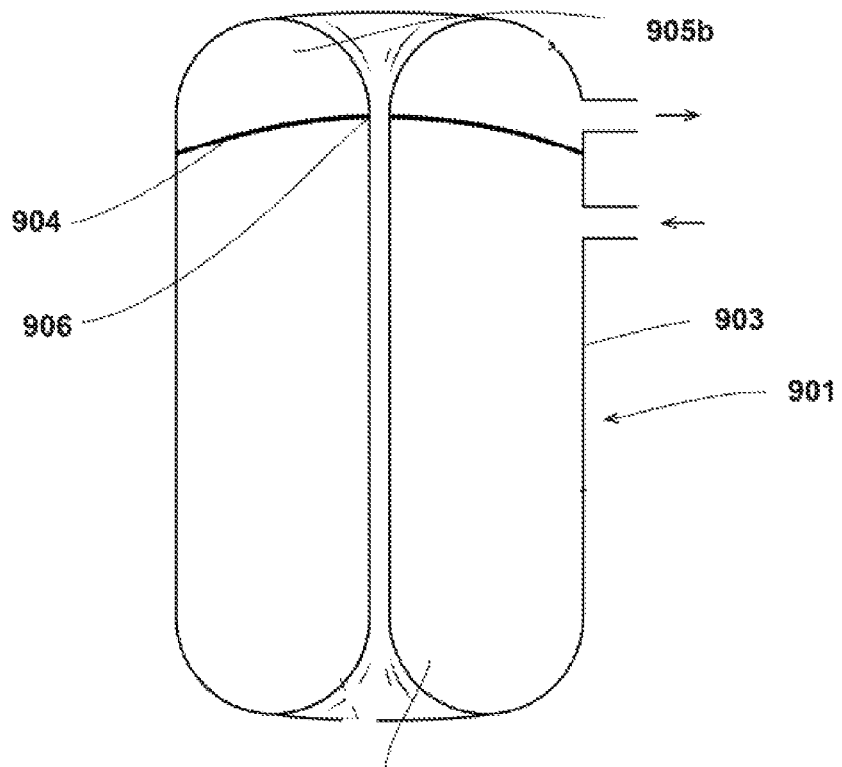
Figure 11:
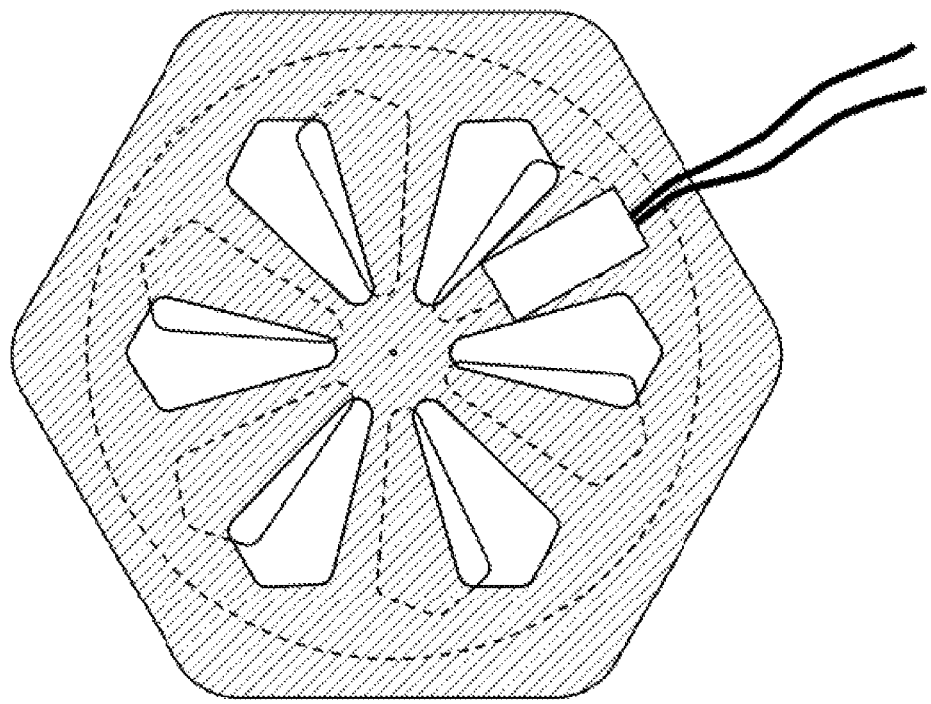
FIG. 11 is a photograph of a rotary gridiron valve which may be present within the structures of FIGS. 1 to 10.
Figure 12A:
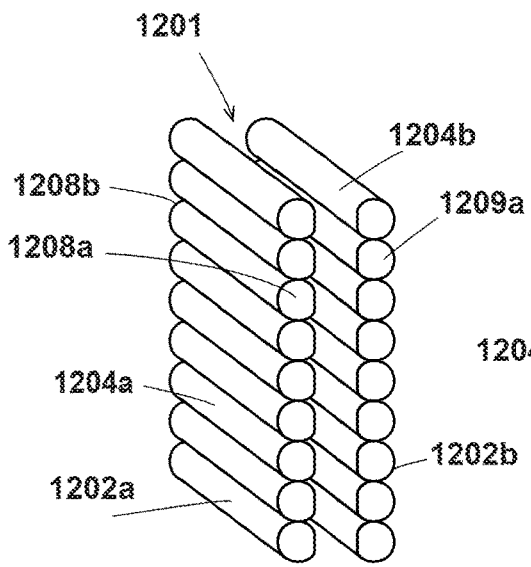
FIGS. 12A to 12D are schematic illustrations of one embodiment of the inflatable, moveable structure according to one embodiment of the present invention.
Figure 12B:
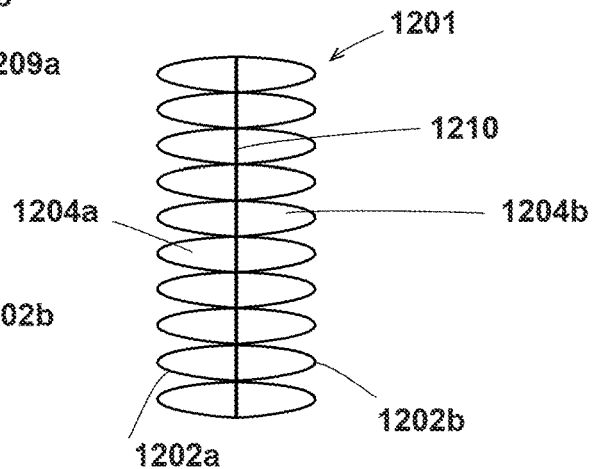
Figure 12C:
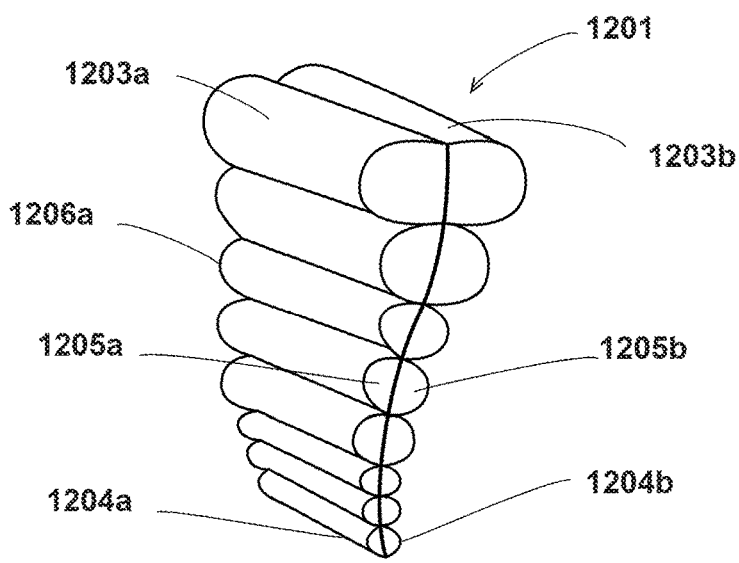
Figure 12D:
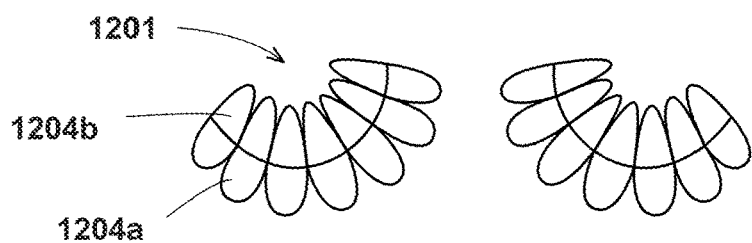

With reference to FIGS. 9A-B, there is provided an inflatable, moveable structure 901 capable of inversion. The inflatable, moveable structure 901 comprises an annular chamber 902 comprising a continuous outer membrane 903. The structure further comprises an inner membrane 904 extending between opposed inner surfaces of the annular chamber 902. The inner membrane 904 provides an aperture configured to enable the outer membrane 903 to extend therethrough. The annular chamber 902 defines a pair of cavities 905a, 905b, each cavity 905a, 905b extending between a corresponding portion of the outer membrane 903 and the inner membrane 904. The structure further comprises a fluid supply in communication with each cavity 905a, 905b of the annular chamber 902, and a control system to independently control the supply of fluid from the fluid supply to each cavity.

In use, as shown in FIG. 9A, both chambers 905a, 905b are supplied with fluid and the structure is presented in a first configuration. In FIG. 9B, the first chamber 905a is supplied with fluid and fluid is removed from the second chamber 905b. As a result, the pressure in the first chamber 905a increases relative to the pressure in the second chamber 905b, causing the outer membrane 903 of the cylindrical chamber 905b to be pulled through the hole 906 causing extension of the first chamber 905a to provide the structure in a second configuration. It is to be understood that the structure 901 can be 'inverted' by removing fluid from the first chamber 905a and providing fluid to the second chamber 905b. This causes the outer membrane to be dragged in an opposite direction through hole 906 causing extension of the second chamber 905b in the opposed direction.

With reference to FIGS. 10A-C, the inflatable structure 1001 works in a similar manner to that described in relation to FIGS. 9A-C. The structure 1001 comprises a single annular chamber 1002 in communication with a fluid source. The annular chamber 1003 is defined by an outer membrane 1003 and a base portion 1004. The outer membrane 1003 is secured at both ends thereof to the base portion 1004. During supply of fluid to the chamber 1002, the structure extends in a lengthwise direction away from base portion 1004 as outer membrane 1003 extends from the centre of the structure. During removal of fluid from the chamber 1002, the structure retracts, and the outer membrane located towards the centre of the structure 1001 contracts due to gravity and/or due to elastic pulling, and the structure 1001 moves towards the base portion 1004.

With reference to FIGS. 12A to 12D, the inflatable, moveable structure 1201 comprises a pair of chamber arrangements 1202a, 1202b. Each chamber arrangement 1202a, 1202b comprises a plurality of chambers 1204. The chamber arrangements 1202a, 1202b are substantially planar in shape.

Each chamber arrangement 1202a, 1202b comprises a first end 1203a, 1203b, an opposed second end 1204a, 1204b, and side portions 1205a, 1205b, 1206a, 1206b extending therebetween.

Each chamber arrangement 1202a, 1202b is linked to or bears on, in use, the other chamber arrangement 1202a, 1202b.

The first chamber arrangement 1202a comprises eight or nine first chambers 1204a. It is however to be understood that the arrangement may comprise any suitable number of chambers depending on the requirements for the structure. Each first chamber 1204a comprises a substantially inelastic outer membrane defining a cavity extending therebetween. Each first chamber 1204a comprises a first end 1208a, and opposed second end 1209a and a longtiduinal axis extending therebetween. The first chambers 1204a are arranged such that the longitudinal axes of each first chamber 1204a are aligned within the first chamber arrangement 1202a. Each cavity is in fluid communication with the fluid source, and in which one or more first chambers 1204a comprises at least one first valve located on and extending through the outer membrane thereof.

The second chamber arrangement 1202b comprises eight or nine second chambers 1204b. It is however to be understood that the arrangement may comprise any suitable number of chambers depending on the requirements for the structure. Each second chamber 1204b comprises a substantially inelastic outer membrane defining a cavity extending therebetween. Each second chamber 1204b comprises a first end 1208b, and opposed second end 1209b and a longtiduinal axis extending therebetween. The second chambers 1204b are arranged such that the longitudinal axes of each second chamber 1204b are aligned within the second chamber arrangement 1202b. Each cavity is in fluid communication with the fluid source, and in which one or more second chambers 1207b comprises at least one second valve located on and extending through the outer membrane thereof.

The longitudinal axes of the first and second chambers 1204a,b preferably extends at an angle to, preferably perpendicular to, the longitudinal axis extending between the first and second ends 1203, 1204 of the corresponding chamber arrangement 1202. The angle at which the longitudinal axes extend in relation to the longitudinal axis of the corresponding chamber arrangement 1202 may vary depending on the requirements for the structure, and the direction and/or degree of movement thereof.

The first chamber arrangement 1202a is configured in use such that one or more first chamber 1204a is linked to or to bears on a corresponding second chamber 1204b provided by the second chamber arrangement 1202b. It can be seen in FIG. 12B that the first chamber arrangement 1202a is linked to the second chamber arrangement 1202b by a membrane 1210 placed therebetween.

The first and second chamber arrangements 1202a,b are independently in fluid communication with the fluid source. A third valve is located between the fluid source and the first and/or second chamber arrangement 1202a,b. The structure 1201 further comprises a control system comprising at least one of: a plurality of pressure sensors. A pressure sensor(s) is located within a corresponding chamber 1204a of the first chamber arrangement 1202a, and a further pressure sensor(s) is located with a corresponding chamber 1204b of the second chamber arrangements 1202b. The pressure sensors are operable to determine the pressure of the fluid within and/or the pressure ratio of the fluid between the corresponding chambers 1204*a,b* of the first and second chamber arrangements 1202*a,b*.

The first chambers and second chambers are independently in fluid communication with the fluid source.

In use, the control system determines the pressure within respective chambers 1204*a*, 1204*b* of the arrangements 1202*a, b* and supplies/removes fluid accordingly via the valves. By controlling the pressure and pressure ratio between the chambers of the structure 1201, the control system can control and vary the direction of degree of bend of the structure 1201 as one chamber arrangement becomes more pressurised than the adjacent chamber arrangement leading to curvature of the structure 1201. The direction and degree of bend of the structure can be continuously, and smoothly, varied and controlled whilst maintaining a taut outer structure.

Figure 13A:
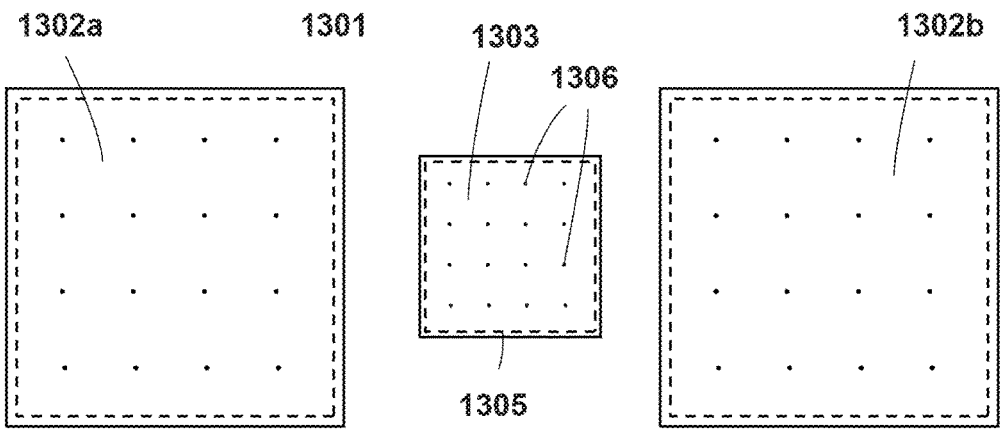
Figure 13B:
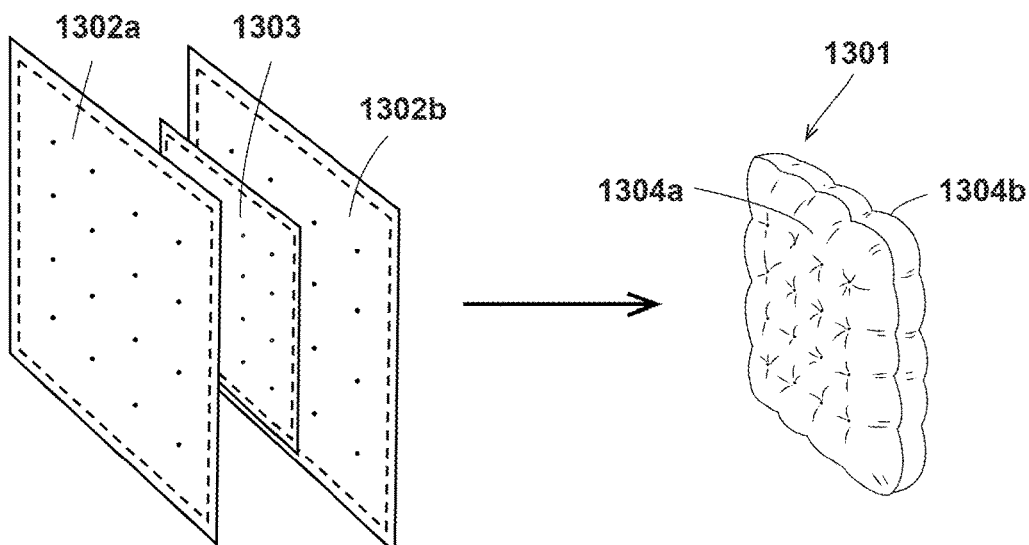
Figure 13C:
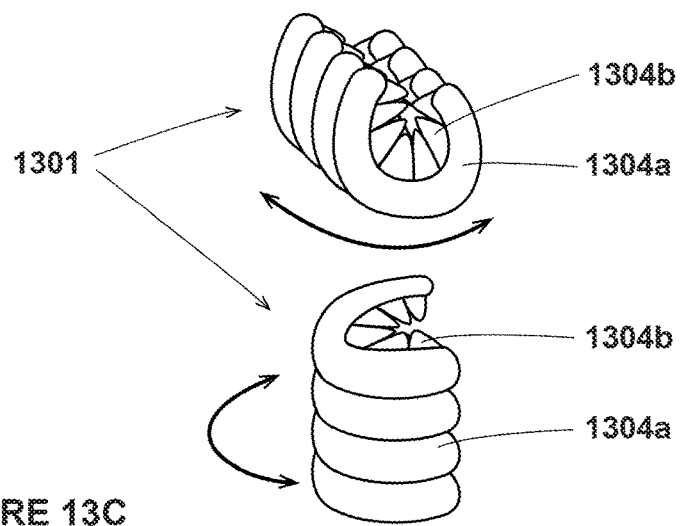

With reference to FIGS. 13A to 13C, the inflatable, moveable structure 1301 is formed form a first substantially inelastic outer membrane 1302*a* and a second substantially inelastic outer membrane 1302*b*. The structure 1301 further comprises a substantially inelastic inner membrane 1303 located between the first and second outer membranes 1302*a,b*.

The structure comprises a pair of antagonistic chambers 1304*a*, 1304*b*. The first antagonistic chamber 1304*a* is formed between the first substantially inelastic outer membrane 1302*a* joined to the substantially inelastic inner membrane 1303. The second antagonistic chamber 1304*b* is formed between a second substantially inelastic outer membrane 1302*b* joined to the substantially inelastic inner membrane 1303. Each chamber is in fluid communication with a fluid source.

Each of the first and second outer membranes 1302*a,b* are larger in dimension to the inner membrane 1303 (as shown in FIGS. 13A and 13B).

In the illustrated embodiment, the inner membrane 1303 is substantially centrally located relative to the outer membrane 1302*a,b*. It is however to be understood that the inner membrane may be offset from a central location relative to one or each outer membrane depending on the requirements, in particular the movement requirements, for the structure 1301.

In the illustrated embodiment, the outer membranes 1302*a,b* and the inner membrane 1303 are substantially square in shape. It is however to be understood that the shapes of the membranes may vary depending on the particular requirements. Preferably, the shape of the outer membranes is the same as the shape of the inner membrane.

As shown in FIGS. 13A and B, the outer membranes 1302*a,b* are identical in size and shape. It is however to be understood that the outer membranes may differ in one or both of size and/or shape depending on the requirements, in particular on the movement requirements, of the structure.

It can be seen that the outer membranes 1302*a,b* are roughly 100% larger than the inner membrane 1303. It is however to be understood that the aspect ratio (the ratio of the dimension of the inner membrane to the corresponding dimension of the outer membrane) may vary.

Each outer membrane 1302*a,b* is adjoined to the inner membrane 1303 at or adjacent the periphery 1305 thereof. Each outer membrane 1302*a,b* is also joined at a plurality of spaced apart locations 1306, in for example a grid arrangement, across the adjacent surface of the inner membrane 1303. The number of spaced apart join locations 1306 may vary and the location of each join location on the inner membrane 1303 may vary. In the illustrated embodiment, the grid arrangement is in a regular arrangement which the joins 1306 are all aligned in a first direction and also in a second orthogonal direction along the surface of the inner membrane 1303. The grid arrangement of spaced apart locations of joins 1306 for the first outer membrane 1302*a* is the same as the grid arrangement of spaced apart locations of joins 1306 for the second outer membrane 1302*b*. It is however to be understood that the grid arrangement, and in particular the joins 1306, may be provided in any suitable arrangement, for example in an irregular arrangement.

The ratio of the dimensions of the outer to inner membrane can be varied to alter the maximum curvature of the resultant structure. The aspect ratio of the grid arrangement of locations of joins controls the direction of curvature of the structure. The spacing between the joins on the grid arrangement controls the thickness of the inflated structure.

Each of the first and second antagonistic chambers 1304*a,b* are in independent fluid communication with a fluid source. Each chamber 1304*a,b* comprises at least one first valve located on and extending through the outer membrane thereof.

The structure 1301 further comprises a control system comprising a plurality of pressure sensors. Each pressure sensor is located within a corresponding first or second antagonistic chamber 1304*a,b* and operable to determine the pressure of the fluid within the corresponding chamber 1304*a,b* and/or the pressure ratio between the first and second antagonistic chambers 1304*a,b*.

The structure may further comprise at least one second valve located between the fluid source and at least one chamber, preferably each chamber, of the or each pair of antagonistic chambers.

The shape and movement of the resultant structure 1301 can be controlled and varied by a control system. The control system comprises a plurality of pressure sensors. A pressure sensor is located within each of the first and second antagonistic chambers 1304*a,b* and operable to determine the pressure of the fluid within the corresponding chamber and/or the pressure ratio between chambers. The control system is operable to independently control operation of the at least one first and/or second valve in communication with the at least one corresponding chamber in response to effect movement of the structure, for example to cause rolling or bending of the structure as shown in FIGS. 13C and 13D.

With reference to FIGS. 14A-c, the inflatable, moveable structure 1401 comprises a first chamber 1402 which in the illustrated embodiment is an elongate first chamber. The first chamber 1402 comprises a substantially inelastic outer membrane defining a first cavity extending therebetween. The first chamber 1402 comprises a first end 1403, a second opposed end 1404 and defines a first elongate axis extending therebetween. The first cavity 1402 is in fluid communication with the fluid source, and in which the chamber 1402 further comprises at least one first valve located on and extending through the outer membrane thereof.

The structure 1401 further comprises a pair of second chamber 1405 in fluid communication with and extending from a first end 1403 of the first chamber 1402 and at an angle to the elongate axis of the first chamber 1402. In the first open position as shown in FIGS. 14A and 14B, the pair of second chambers 1405 extend outwardly away from the elongate axis of the first chamber 1402 and from each other.

The structure 1401 further comprises a third chamber 1406 having an annular shape and positioned on and to surround the first end 1403 of the first chamber 1402 and at least a portion of the second chamber 1405.

The structure 1401 further comprises a second valve located on and extending through the outer membrane of the third chamber 1406, It is to be understood that the first and second chambers 1402, 1405 may be formed as a single, integral chamber. Alternatively, the first and second chambers 1402, 1405 may be separate chambers which are in fluid communication with each other. The second chamber 1405 may therefore comprise a further valve extending through the outer membrane thereof.

The structure 1401 comprises a plurality of pressure sensors. A pressure sensor is located within at least the first chamber 1402 and the third chamber 1406 (preferably located within each of the first, second and third chambers 1402, 1405, 1406), and operable to determine the pressure of the fluid within the corresponding chamber and/or the pressure ratio between chambers.

The control system is operable to independently control operation of the at least one first and/or second valve in communication with the at least one corresponding chamber in response to effect movement of the second chamber(s) towards or away from the elongate axis of the first chamber.

When the pressure within the third chamber 1406 exceeds a predetermined value, the third chamber expands and bears on the second chambers 1405 sufficiently, at the join 1403 between the first 1402 and second 1405 chambers, to bring the second 1405 chambers, in particular the elongate axes defined between opposed ends thereof, towards, for example into alignment with, the elongate axis defined by the first chamber 1402 into the "closed" position as shown in FIG. 14C.

When the pressure within the third chamber 1406 is less than a predetermined value, the second chambers 1405 may bear against the third chamber and separate from each other, and extend away from the elongate axis defined by the first chamber 1402 to move towards their original, unpressurized position, into the "open" position as shown in FIG. 14B. This movement can be controlled and repeated by the control system to provide a smooth open and closing visual effect.

With reference to FIGS. 15A-C, the inflatable, moveable structure 1501 comprises a set of antagonistic chambers 1502a, 1502b. The first antagonistic chamber 1502a is formed between a first substantially inelastic outer membrane 1503a joined to a substantially inelastic inner membrane 1504. The second antagonistic chamber 1502b is formed between a second substantially inelastic outer membrane 1503b joined to the opposing surface of the substantially inelastic inner membrane 1504.

Each of the first and second outer membranes 1503a,b are larger in dimension than the inner membrane 1504.

Each of the first and second antagonistic chambers 1502a,b is in independent fluid communication with a fluid source to supply fluid to/receive fluid from the corresponding chamber.

Each chamber 1502a,b further comprises a first valve located on and extending through the outer membrane 1503a,b thereof.

The structure 1501 further comprises a control system comprising a plurality of pressure sensors. Each pressure sensor is located within a corresponding first or second antagonistic chamber 1502a,b and operable to determine the pressure of the fluid within the corresponding chamber and/or the pressure ratio between the first and second antagonistic chambers, The control system is operable to control the first valves of the chambers such that a first chamber within the or each set of antagonistic chambers acts in opposition to the other chamber(s) within the corresponding set of antagonistic chambers.

As shown in FIG. 15A, the outer membranes 1503a,b are longer in length than the inner membrane 1504 and the structure is an elongate structure.

The outer membranes are joined along the periphery 1505 thereof to the inner membrane 1503. The outer membranes 1503a,b are pleated along the length thereof. The structure 1501 may further comprise a base extending between a free end of each outer membrane 1503a,b and the free end of the inner membrane 1504.

In use, the control system provides fluid into a corresponding chamber 1502a,b of the pair of antagonistic chambers. As the fluid (and pressure) increases within a first chamber 1502a, and the fluid (and pressure) decreases within the second chamber 1502b, the first chamber 1502a extends in length and bears on the second chamber 1502b (as shown in FIG. 15C) which contracts, causing the structure to bend. The degree of bend of the structure 1501 may be controlled by the ratio of lengths between the outer membrane and inner membrane and by the ratio of pressures within the set of antagonistic chambers 1502a,b. The degree of bend and the direction of bend can be controlled effectively by the control system to provide continuous movement of the structure 1501 whilst maintaining a taut outer surface.

The invention claimed is:

1. An inflatable, moveable structure comprising:
a fluid source;
at least one chamber comprising a substantially inelastic outer membrane defining a cavity extending therebetween, in which the or each cavity is in fluid communication with the fluid source;
a regulatory mechanism in communication with the or each chamber, in which the regulatory mechanism is configured to control fluid flow into or out of the corresponding cavity; and
a control system comprising at least one sensor, in which the at least one sensor comprises:
at least one pressure sensor, the or each pressure sensor located within a corresponding chamber and operable to determine the pressure of the fluid within the corresponding chamber and/or the pressure ratio of fluid within at least two chambers; and/or
at least one spatial orientation sensor configured to determine the spatial orientation of the at least one chambers;
a plurality of elongate, hollow tubular members comprising the substantially inelastic outer membrane defining the cavity extending therebetween,
each tubular member having a first end configured to be independently in communication with the fluid source, and a closed second opposed end, defining a fluid conduit extending therebetween,
each elongate hollow tubular member comprising at least one chamber extending outwardly from and along a length of the tubular member,
the or each chamber being in communication with the fluid conduit and one or more adjacent chambers when present,
wherein the plurality of elongate hollow tubular members are configured in use to be positioned at or adjacent each other such that longitudinal axes of the tubular members are aligned and such that the at least one chamber of each tubular member extends outwardly away from the at least one chamber of adjacent elongate hollow tubular members, and
wherein the control system is operable to effect movement of the structure by controlling operation of the regulatory mechanism in response to one or more of the determined spatial orientation of the structure as determined by the spatial orientation sensor(s) and/or fluid pressure within the corresponding chamber(s) and/or pressure ratio of fluid within at least two chambers as determined by the pressure sensor(s).

2. The structure as claimed in claim 1, in which the structure comprises at least one set of antagonistic chambers.

3. The structure as claimed in claim 2, in which the control system is operable to supply fluid to each chamber of the or each set of antagonistic chambers such that a first chamber within the or each set of antagonistic chambers acts in opposition to the other chamber(s) within the corresponding set of antagonistic chambers.

4. The structure as claimed in claim 1, in which the at least one spatial orientation sensor(s) is an IMU.

5. The structure as claimed in claim 1, in which the control system is operable to independently move the regulatory mechanism to an open position or to a closed position, or to any position therebetween, in response to the determined pressure and/or pressure ratio of the fluid within the corresponding chamber(s).

6. The structure as claimed in claim 1, in which the fluid source comprises gases or gas mixtures, or liquids such as for example water or oil, or mixtures thereof.

7. The structure as claimed in claim 1, in which the inelastic outer membrane is joined together, to provide a chamber and/or to connect adjacent chambers together, using sewing, heat sealing or RF welding.

8. The structure as claimed in claim 1, further comprising a fluid-box in communication with the fluid source, located adjacent, and in fluid communication with, a corresponding cavity of a chamber.

9. The structure as claimed in claim 1, further comprising a second regulatory mechanism located between the fluid source and the at least one chamber.

10. The structure as claimed in claim 1, further comprising a valve box spaced apart from the or each chamber(s), in which each valve box is connected to a corresponding chamber.

11. The structure as claimed in claim 1, further comprising one or more rigid element chambers configured in use to be permanently inflated and/or one or more non-inflatable rigid elements.

12. The structure as claimed in claim 1, further comprising one or more translucent portions.

13. The structure as claimed in claim 12, in which the inelastic outer membrane, or a portion thereof, of one or more chambers comprises one or more translucent portions.

14. The structure as claimed in claim 12, further comprising one or more lighting devices, located at or adjacent one or more translucent portions, configured to illuminate the structure at or adjacent one or more translucent portions.

15. An inflatable, moveable structure comprising:
a fluid source;
at least one chamber comprising a substantially inelastic outer membrane defining a cavity extending therebetween, in which the or each cavity is in fluid communication with the fluid source;
a regulatory mechanism in communication with the or each chamber, in which the regulatory mechanism is configured to control fluid flow into or out of the corresponding cavity; and
a control system comprising at least one sensor, in which the at least one sensor comprises:
at least one pressure sensor, the or each pressure sensor located within a corresponding chamber and operable to determine the pressure of the fluid within the corresponding chamber and/or the pressure ratio of fluid within at least two chambers; and/or
at least one spatial orientation sensor configured to determine the spatial orientation of the at least one chambers,
in which the control system is operable to effect movement of the structure by controlling operation of the regulatory mechanism in response to one or more of the determined spatial orientation of the structure as determined by the spatial orientation sensor(s) and/or fluid pressure within the corresponding chamber(s) and/or pressure ratio of fluid within at least two chambers as determined by the pressure sensor(s), and
in which the outer membrane of one or more chambers comprises a pattern or visual markers which are configured to be distorted when contacted by an external element, and in which the control system further comprises a camera system configured to detect distortion of a pattern or a visual marker of a chamber when distorted by contact.

16. The structure as claimed in claim 1, further comprising a modulated light source configured to be placed within the structure, for example within a cavity of a chamber, and in which the control system further comprises a light sensor configured to be positioned such that in use the light sensor can detect reflected modulated light when an outer membrane of the structure is contacted by an external element.

17. The structure as claimed in claim 1, in which the or each chamber is in the form of a spike-shaped or lobe-shaped chamber.

18. The structure as claimed in claim 1, in which each elongate hollow tubular member is adjoined to one or more other hollow tubular member.

19. The structure as claimed in claim 1, comprising an elongate inflatable member comprises a substantially inelastic outer member defining a cavity extending therebetween, the elongate inflatable member comprises a first end and an opposed second end defining a longitudinal axis extending therebetween, the elongate inflatable member being configured to be in communication with the fluid supply, and in which the elongate inflatable member comprises at least one circumferentially extending folds or pleats formed in a direction extending at an angle to the longitudinal axis of the elongate inflatable member.

20. The structure as claimed in claim 1, further comprising at least one pull cord chamber located within or adjacent one or more cavities of one or more chamber(s) and in communication with the fluid supply, in which a first end of the or each pull-cord is secured to a first end of a corresponding inflatable chamber, a second opposed end of the or each pull-cord is secured to a second opposed end of the inflatable chamber, and the or each pull-cord extends circumferentially around the pull-cord chamber.

21. The structure as claimed in claim 20, in which the chamber(s) is supported on a pull cord chamber.

22. The structure as claimed in claim 20, in which the chamber(s) is located adjacent to and spaced apart from, in a longitudinal direction, the pull cord chamber.

23. The structure as claimed in claim 1, comprising an inflatable chamber comprising a substantially inelastic outer membrane defining a cavity extending therebetween; a membrane extending between opposing surfaces of the inflatable chamber to divide the cavity into a first cavity portion and a second cavity portion; at least one rigid portion located adjacent the outer membrane, and extending outwardly therefrom, in which the rigid portion(s) is in communication with a peripheral portion of the membrane; in which each cavity portion is independently in fluid communication with a fluid source, and in which each cavity portion further comprises at least one regulatory mechanism configured to control fluid flow into or out of the corresponding cavity portion.

24. The structure as claimed in claim 1, configured to provide a two-axis hinge.

25. The structure as claimed in claim 24, comprising a plurality of opposed pleated bellows defining the plurality of chambers, in which the bellows are configured to be in communication with a fluid supply.

26. The structure as claimed in claim 1, comprising an inflatable cylindrical chamber comprising a substantially inelastic outer membrane defining a first cavity; an inflatable annulus chamber comprising a substantially inelastic outer membrane defining a second cavity, in which the annulus chamber extends circumferentially about the inflatable cylindrical chamber; and a twist formed between the cylindrical chamber and the annulus chamber; in which each chamber is configured to be independently in fluid communication with a fluid supply, and in which each chamber comprises a regulatory mechanism, and a pressure sensor configured to determine the fluid pressure within and/or pressure ratios between the corresponding cavity(ies).

27. The structure as claimed in claim 1, comprising an annular chamber comprising a continuous, substantially inelastic outer membrane; a substantially inelastic inner membrane extending between opposed inner surfaces of the annular chamber, in which the inner membrane provides an aperture configured to enable the outer membrane to extend therethrough, in which the annular chamber defines a pair of cavities, each cavity extending between a corresponding portion of the outer membrane and the inner membrane; a fluid supply in communication with each cavity of the annular chamber.

28. The structure as claimed in claim 1, comprising an annular chamber comprising a continuous, substantially inelastic outer membrane; and a base portion in communication with the ends of the outer membrane; in which the annular chamber defines a cavity, the cavity extending between a corresponding portion of the outer membrane and the base portion.

29. An inflatable, moveable structure comprising:
a fluid source;
one or more chamber arrangements, in which each chamber arrangement comprises a plurality of chambers each comprising a substantially inelastic outer membrane defining a cavity extending therebetween, wherein each chamber arrangement is independently in communication with a fluid source, in which the or each chamber arrangement is linked to or bears on, in use, a further chamber arrangement;
a regulatory mechanism in communication with the or each chamber, in which the regulatory mechanism is configured to control fluid flow into or out of the corresponding cavity; and
a control system comprising at least one sensor, in which the at least one sensor comprises:
at least one pressure sensor, the or each pressure sensor located within a corresponding chamber and operable to determine the pressure of the fluid within the corresponding chamber and/or the pressure ratio of fluid within at least two chambers; and/or
at least one spatial orientation sensor configured to determine the spatial orientation of at least one of the chambers,
in which the control system is operable to effect movement of the structure by controlling operation of the regulatory mechanism in response to one or more of the determined spatial orientation of the structure as determined by the spatial orientation sensor(s) and/or fluid pressure within the corresponding chamber(s) and/or pressure ratio of fluid within at least two chambers as determined by the pressure sensor(s).

30. The structure as claimed in claim 29, comprising a first chamber arrangement comprising a plurality of first chambers, each first chamber comprising a substantially inelastic outer membrane defining a cavity extending therebetween, in which each first chamber comprises a first end, and opposed second end and a longitudinal axis extending therebetween, and in which the plurality of first chambers are arranged such that the longitudinal axes of each first chamber are aligned, and in which each cavity is in fluid communication with the fluid source, and in which one or more first chamber further comprises a regulatory mechanism;
a second chamber arrangement comprising a plurality of second chambers, each second chamber comprising a substantially inelastic outer membrane defining a cavity extending therebetween, in which each second chamber comprises a first end, and opposed second end and a longitudinal axis extending therebetween, and in which the plurality of second chambers are arranged such that the longitudinal axes of each second chamber are aligned, and in which each cavity is in fluid communication with the fluid source, and in which one or more second chamber further comprises at least one second valve located on and extending through the outer membrane thereof;
in which the first chamber arrangement is configured in use such that one or more first chamber is linked to or to bears on a corresponding second chamber provided by the second chamber arrangement,
in which the first and second chamber arrangements are independently in fluid communication with the fluid source,
at least one third valve located between the fluid source and the first and/or second chamber arrangement; and
a control system comprising at least one of:
a plurality of pressure sensors, at least one pressure sensor being located within a corresponding chamber of the first chamber arrangement, and at least one pressure sensor being located with a corresponding chamber of the second chamber arrangements, and operable to determine the pressure of the fluid within and/or the pressure ratio of the fluid between the corresponding chambers of the first and second chamber arrangements.

31. The structure as claimed in claim 29, further comprising a support substrate, positioned between the first and second chamber arrangements, in which the one or more of the first and second chamber arrangements are linked to or bear on the support substrate.

32. The structure as claimed in claim 29, in which the or each chamber arrangement comprises a plurality of aligned elongate chambers, and in which the longitudinal axes of the chambers extend at an angle to the longitudinal axis of the chamber arrangement.

33. The structure as claimed in claim 1, comprising at least one pair of antagonistic chambers,
- a first antagonistic chamber of which is formed between a first substantially inelastic outer membrane joined to a substantially inelastic inner membrane, and
- a second antagonistic chamber of which is formed between a second substantially inelastic outer membrane joined to the substantially inelastic inner membrane,
- in which each of the first and second outer membranes are larger in dimension to the inner membrane, and
- in which each of the first and second antagonistic chamber is in independent fluid communication with the fluid source, and in which each chamber further comprises a regulatory mechanism.

34. The structure as claimed in claim 33, in which the outer membrane is adjoined to the inner membrane at or adjacent the periphery thereof, and in which each outer membrane is also joined at a plurality of spaced apart locations, in a grid arrangement, across an adjacent surface of the inner membrane.

35. The structure as claimed in claim 1, comprising a first chamber comprising a substantially inelastic outer membrane defining a first cavity extending therebetween, in which the first chamber comprises a first end, a second opposed end and defines a first elongate axis extending therebetween, in which the first cavity is in fluid communication with the fluid source, and in which the or each chamber further comprises a first regulatory mechanism;
- at least one second chamber in fluid communication with and extending from a first end of the first chamber and at an angle to the elongate axis of the first chamber; and
- a third chamber having an annular shape and positioned on and to surround the first end of the first chamber and at least a portion of the second chamber, and a second regulatory mechanism in communication with third chamber, in which the second regulatory mechanism is configured to control fluid flow into or out of the corresponding cavity of the third chamber,
- in which the control system comprises at least one of:
  - a plurality of pressure sensors, each pressure sensor located within at least the first chamber and the third chamber (preferably located within each of the first, second and third chambers), and operable to determine the pressure of the fluid within the corresponding chamber and/or the pressure ratio between chambers,
  - in which the control system is operable to independently control operation of the first and/or second regulatory mechanisms to effect movement of the second chamber(s) towards or away from the elongate axis of the first chamber.

36. The structure as claimed in claim 1, comprising at least one set of antagonistic chambers, in which
- a first antagonistic chamber is formed between a first substantially inelastic outer membrane joined to a substantially inelastic inner membrane, and
- a second antagonistic chamber is formed between a second substantially inelastic outer membrane joined to the substantially inelastic inner membrane,
- in which each of the first and second outer membranes are larger in dimension to the inner membrane, and in which each of the first and second antagonistic chamber is in independent fluid communication with the fluid source, and
- in which each chamber further comprises a regulatory mechanism; and
- in which the control system comprises at least one of:
- a plurality of pressure sensors, each pressure sensor being located within a corresponding first or second antagonistic chamber and operable to determine the pressure of the fluid within the corresponding chamber and/or the pressure ratio between the first and second antagonistic chambers,
- in which the control system is operable to control the regulatory mechanism of the chambers such that a first chamber within the or each set of antagonistic chambers acts in opposition to the other chamber(s) within the corresponding set of antagonistic chambers.

37. A method of manufacturing an inflatable, moveable structure as claimed in claim 1 comprising:
- obtaining at least one chamber comprising a substantially inelastic outer membrane defining a cavity extending therebetween, and in which the or each chamber further comprises at least one regulatory mechanism in communication with the or each chamber, in which the regulatory mechanism is configured to control fluid flow into or out of the corresponding cavity;
- obtaining a control system comprising at least one of:
- a plurality of pressure sensors, and locating each pressure sensor within a corresponding chamber operable to determine the pressure of the fluid within the corresponding chamber and/or the pressure ratio of fluid within at least two chambers; and/or
- at least one spatial orientation sensor configured to determine the spatial orientation of the at least one chambers;
- and placing a fluid source in communication with the or each cavity of the at least one chamber;
- in which the control system is operable to effect movement by independently controlling operation of the regulatory mechanism(s) in response to one or more of the determined spatial orientation of the structure as determined by the spatial orientation sensor(s) and/or fluid pressure within the corresponding chamber(s) and/or pressure ratio of fluid within at least two chambers as determined by the pressure sensor(s).

* * * * *